US012613347B2

(12) United States Patent
Rosete et al.

(10) Patent No.: US 12,613,347 B2
(45) Date of Patent: Apr. 28, 2026

(54) COLLECTION, DISTRIBUTION, USE OF TIMING/DISTANCE INFORMATION TO DETERMINE LOCATION IN A WIRELESS NETWORK

(71) Applicant: Charter Communications Operating, LLC, St. Louis, MO (US)

(72) Inventors: Andre R. Rosete, San Jose, CA (US); Stephen P. Emeott, Highlands Ranch, CO (US); Gary S. Koerper, Castle Pines, CO (US); Aaron M. Nead, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 648 days.

(21) Appl. No.: 17/963,590

(22) Filed: Oct. 11, 2022

(65) Prior Publication Data

US 2024/0118431 A1 Apr. 11, 2024

(51) Int. Cl.
G01S 19/24 (2010.01)
G01S 19/25 (2010.01)
G01S 19/48 (2010.01)

(52) U.S. Cl.
CPC .......... G01S 19/243 (2013.01); G01S 19/256 (2013.01); G01S 19/485 (2020.05)

(58) Field of Classification Search
CPC ....... H04W 4/02; H04W 4/029; H04W 64/00; H04W 64/003; H04W 28/0226; H04W 4/023; H04W 4/025; H04W 88/08; H04W 4/46; G01S 5/0242; G01S 19/51; G01S 5/0289; G01S 19/40; G01S 19/42; G01S 19/396; G01S 5/0063; G01S 19/256; G01S 19/14; G01S 19/11; G01S 19/36; G01S 19/43; G01S 19/22; G01S 5/0072; G01S 5/0036; G01S 19/03; G01S 19/41; G01S 5/0045; G01S 19/071; G01S 19/243;

(Continued)

(56) References Cited

U.S. PATENT DOCUMENTS

| | | | | |
|---|---|---|---|---|
| 5,390,124 A | * | 2/1995 | Kyrtsos | ............... G05D 1/0278 |
| | | | | 701/470 |
| 2011/0025555 A1 | * | 2/2011 | Whitehead | ............. G01S 19/41 |
| | | | | 342/357.24 |

(Continued)

*Primary Examiner* — Olumide Ajibade Akonai
(74) *Attorney, Agent, or Firm* — Armis IP Law, LLC

(57) ABSTRACT

According to one configuration, an example communication system includes multiple communication devices such as a primary wireless access point and a secondary wireless access point (such as a so-called wireless network extender). The primary wireless access point can be configured to control operation of the secondary wireless access point. A communication management resource (such as location management function) associated with the communication system receives first location information indicating a location of the secondary wireless access point. The communication management resource determines a relative position of the primary wireless access point with respect to the secondary wireless access point. Based on the first location information and the determined relative position, the communication management resource produces (derives) second location information indicating a location of the primary wireless access point.

31 Claims, 13 Drawing Sheets

(58) Field of Classification Search
CPC ........ G01S 19/485; G01S 19/02; G01S 19/07;
G01S 19/10; G01S 19/33; G01S 19/01;
G01S 19/05; G01S 5/009; G01S 19/04
See application file for complete search history.

(56) References Cited

U.S. PATENT DOCUMENTS

| | | | | |
|---|---|---|---|---|
| 2011/0143800 A1* | 6/2011 | Han | .................... | H04W 52/267 |
| | | | | 455/509 |
| 2013/0281110 A1* | 10/2013 | Zelinka | ................... | H04W 4/20 |
| | | | | 455/456.1 |
| 2014/0155084 A1* | 6/2014 | Pon | ....................... | G01S 5/0242 |
| | | | | 455/456.1 |
| 2016/0353242 A1* | 12/2016 | Zeng | ....................... | H04W 4/40 |
| 2017/0272900 A1* | 9/2017 | Do | .......................... | G01S 5/021 |
| 2023/0094902 A1* | 3/2023 | Ma | .......................... | G01S 19/48 |
| | | | | 342/357.31 |

* cited by examiner

200

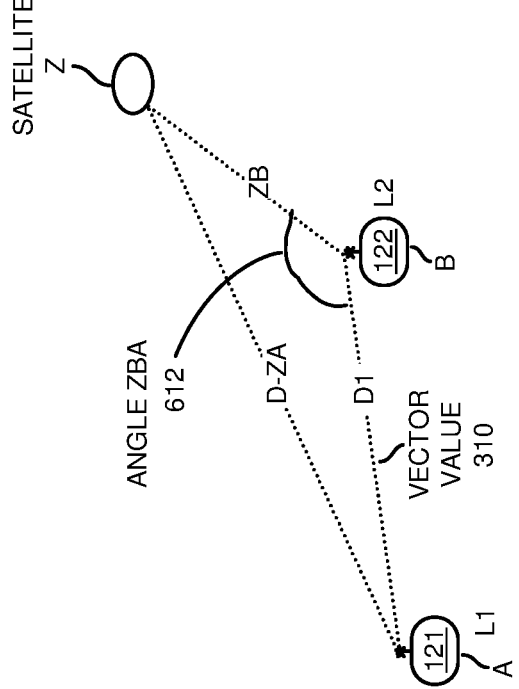
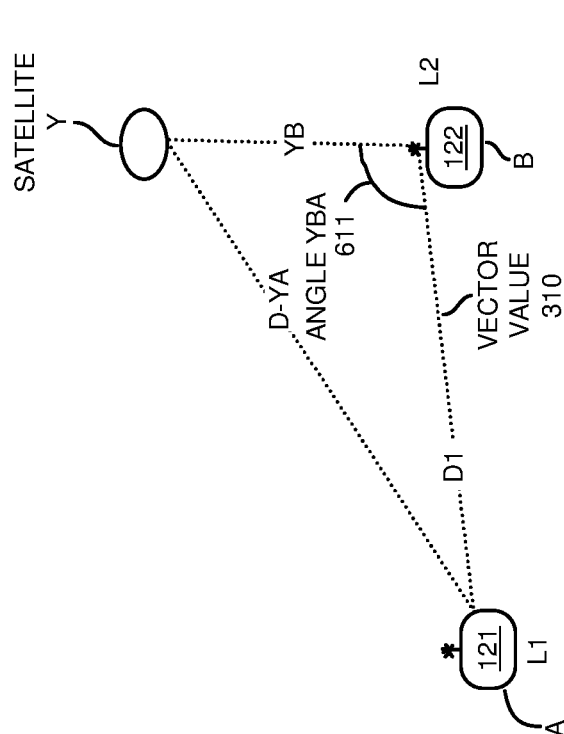
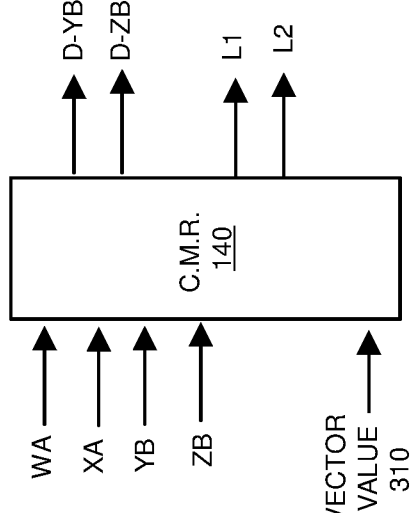
FIG. 6

FIG. 8

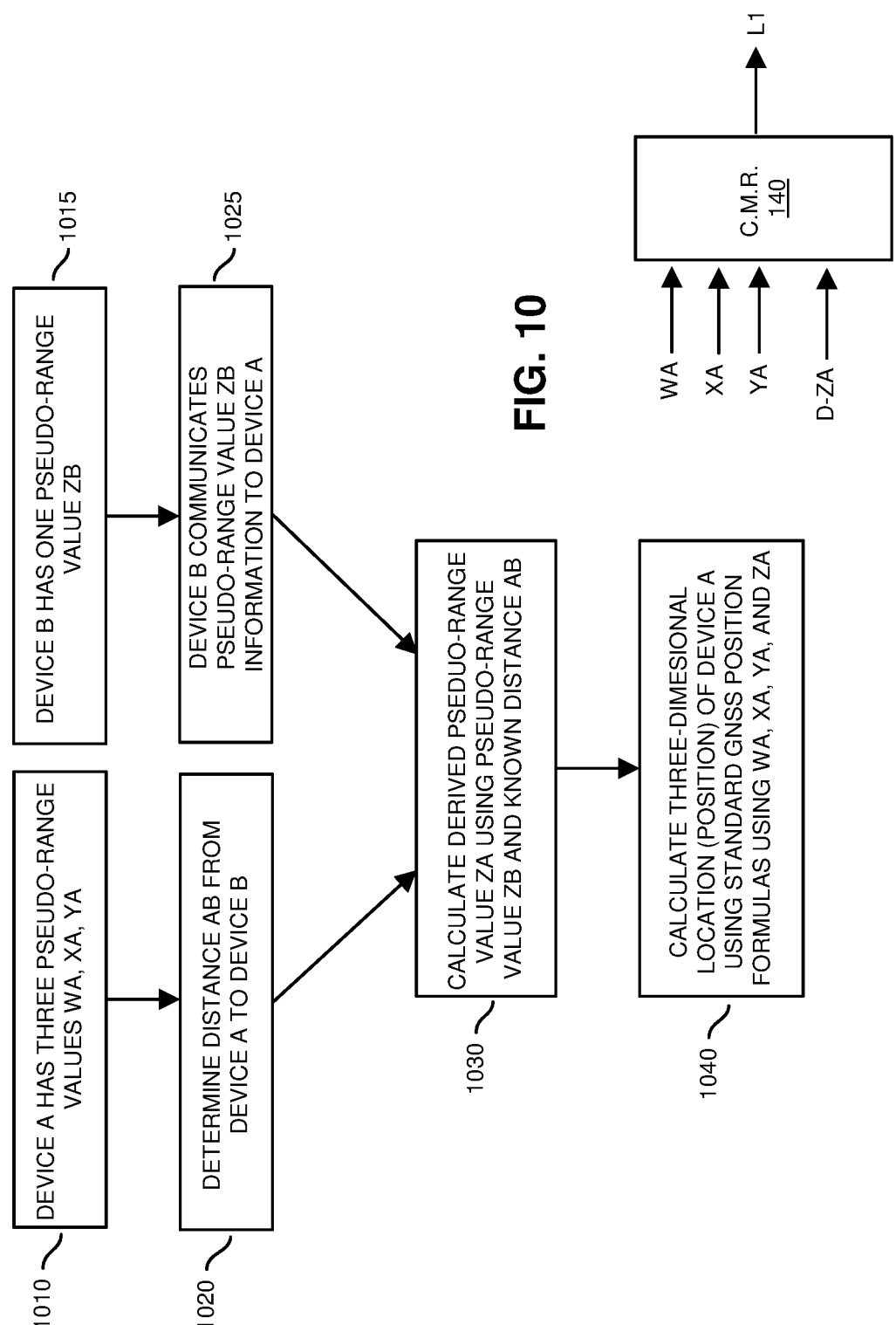

DEVICE B HAS ONE PSEUDO-RANGE VALUE ZB
~1015

DEVICE B COMMUNICATES PSEUDO-RANGE VALUE ZB INFORMATION TO DEVICE A
~1025

DEVICE A HAS THREE PSEUDO-RANGE VALUES WA, XA, YA
1010

DETERMINE DISTANCE AB FROM DEVICE A TO DEVICE B
1020

CALCULATE DERIVED PSEDUO-RANGE VALUE ZA USING PSEUDO-RANGE VALUE ZB AND KNOWN DISTANCE AB
1030

CALCULATE THREE-DIMESIONAL LOCATION (POSITION) OF DEVICE A USING STANDARD GNSS POSITION FORMULAS USING WA, XA, YA, AND ZA
1040

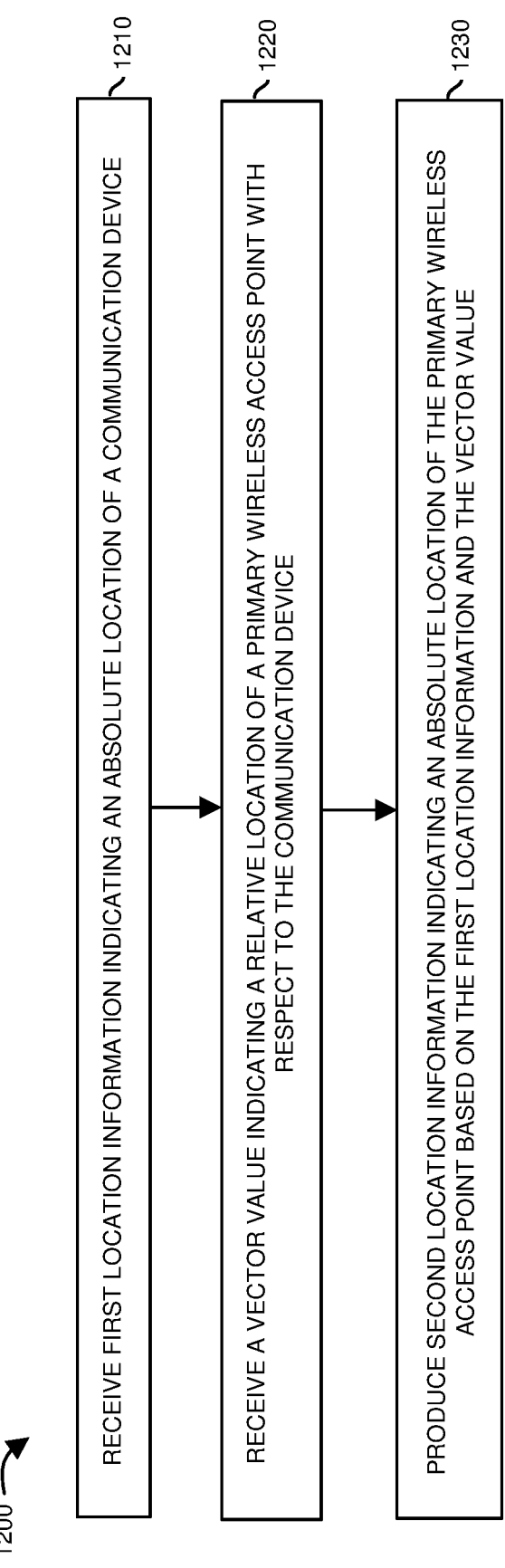

1200

1210
RECEIVE FIRST LOCATION INFORMATION INDICATING AN ABSOLUTE LOCATION OF A COMMUNICATION DEVICE

1220
RECEIVE A VECTOR VALUE INDICATING A RELATIVE LOCATION OF A PRIMARY WIRELESS ACCESS POINT WITH RESPECT TO THE COMMUNICATION DEVICE

1230
PRODUCE SECOND LOCATION INFORMATION INDICATING AN ABSOLUTE LOCATION OF THE PRIMARY WIRELESS ACCESS POINT BASED ON THE FIRST LOCATION INFORMATION AND THE VECTOR VALUE

FIG. 12

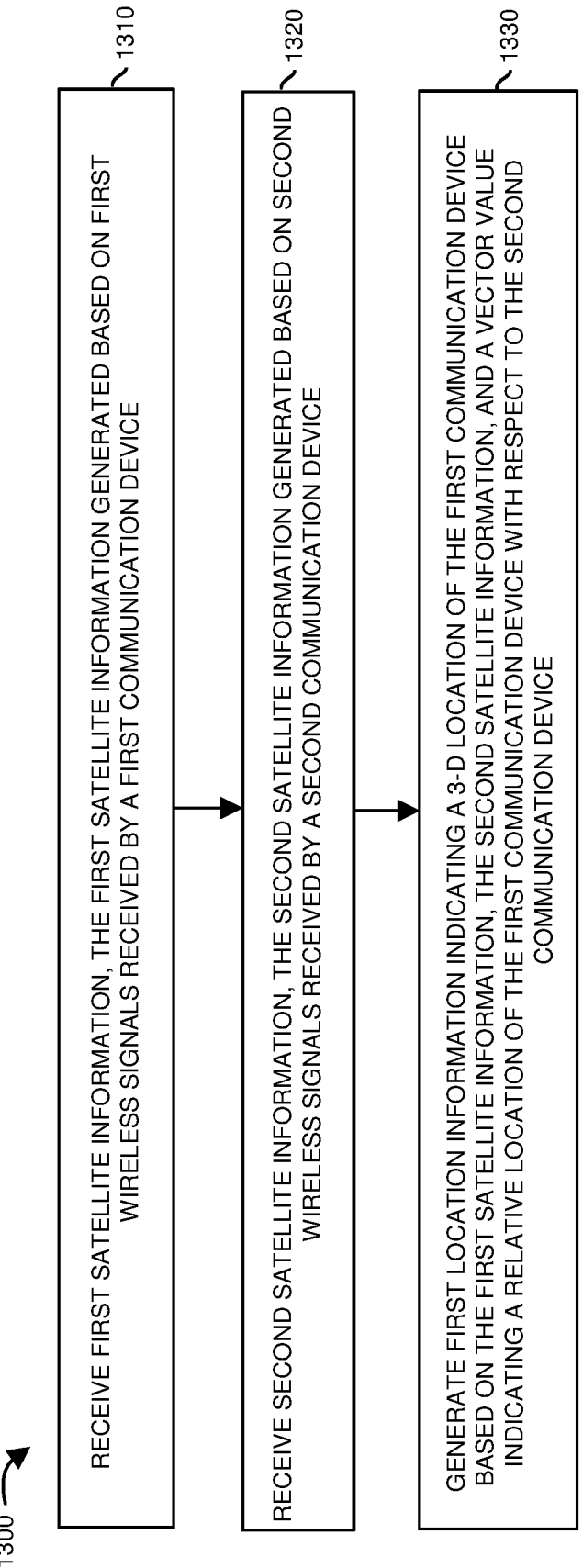

1300

1310 — RECEIVE FIRST SATELLITE INFORMATION, THE FIRST SATELLITE INFORMATION GENERATED BASED ON FIRST WIRELESS SIGNALS RECEIVED BY A FIRST COMMUNICATION DEVICE

1320 — RECEIVE SECOND SATELLITE INFORMATION, THE SECOND SATELLITE INFORMATION GENERATED BASED ON SECOND WIRELESS SIGNALS RECEIVED BY A SECOND COMMUNICATION DEVICE

1330 — GENERATE FIRST LOCATION INFORMATION INDICATING A 3-D LOCATION OF THE FIRST COMMUNICATION DEVICE BASED ON THE FIRST SATELLITE INFORMATION, THE SECOND SATELLITE INFORMATION, AND A VECTOR VALUE INDICATING A RELATIVE LOCATION OF THE FIRST COMMUNICATION DEVICE WITH RESPECT TO THE SECOND COMMUNICATION DEVICE

FIG. 13

COLLECTION, DISTRIBUTION, USE OF TIMING/DISTANCE INFORMATION TO DETERMINE LOCATION IN A WIRELESS NETWORK

BACKGROUND

Conventional wireless networks typically include one or more wireless base stations or wireless access points to provide mobile communication devices (a.k.a., user equipment) access to a remote network such as the Internet. Such wireless access points or base stations can be deployed indoors or outdoors depending on the type of access to be provided.

The 6 GHz band (U-NII-5: 5.925-6.425 GHz; U-NII-7: 6.525-6.875 GHz) has been opened for use by the Federal Communications Commission (FCC) for indoor Wi-Fi™ applications. By default, indoor Wi-Fi™ access points are limited to low-power operation in the 6 GHz band, which significantly limits their effective area of coverage. However, a Wi-Fi™ Access Point (AP) may transmit at standard power indoors on one or more 6 GHz channels if it registers its location with a so-called automatic frequency coordination (AFC) system.

In order to receive a list of channels eligible for standard power operation from an AFC system, Wi-Fi™ APs must submit their geographical location to the AFC system with a 95% level of confidence. In order to maintain access to a standard-power channel, the Wi-Fi™ AP must also submit its geographical location to the AFC system at least once every 24 hours, as well as whenever the AP is power-cycled or moved.

One conventional method of determining the geographical location of a Wi-Fi™ AP is to have it professionally installed at a fixed location with geographical location certification using professional surveying tools. This method provides maximum location certainty, but suffers from very high cost of installation, lack of ability to move the AP without again incurring those costs, and the risk that the FCC may not accept this method of location report as acceptable for residential applications.

Another conventional method for determining the geographical location of a wireless access point is to equip an indoor AP with an integrated global navigation satellite system (GNSS) receiver. GNSS or global navigation satellite system refers to a constellation of satellites providing signals from space that transmit positioning and timing data to GNSS receivers so that the latter can estimate their own location. Each GNSS provides global coverage. Examples of GNSSs include GPS, GLONASS, Beidou, and Galileo. GPS refers to NavStar, a GNSS maintained and operated by the Space Force of the United States of America.

GNSSs, such as the Global Positioning System (GPS), allow a GNSS receiver to compute its own geographical location by receiving signals from various satellites orbiting the Earth. A Wi Fi™ AP equipped with an integrated GNSS receiver can determine its own geographical location and report it to an AFC system in order to gain access to standard-power 6 GHz-band channels. Unfortunately, a Wi-Fi™ AP is placed inside of a customer premises to fit the needs and preferences of the customer. Building materials (such as walls, ceilings, etc.) typically attenuate GNSS signals. The deeper inside a building a GNSS receiver is located, the less likely it is to be able to precisely determine its own location using GNSS signals. This may result in a Wi-Fi™ AP placement that attenuates GNSS signals to the AP to such a degree that the access point itself is unable to compute and report its geographical location with a 95% level of confidence, rendering the AP unable to utilize 6 GHz-band channels with standard power and reducing its effective area of coverage.

Another approach uses an externally-attached GNSS receiver connected to the AP via cable. This approach creates uncertainty about the placement of the GNSS receiver with respect to the Wi-Fi AP. This uncertainty could be as high as the length of the cable, and the length and orientation of the cable are unknown. This approach also requires an external antenna connector on the AP, which introduces a point of hardware failure on the router.

Yet another conventional approach to determining location includes use of a Wi-Fi™ client device (such as a smartphone), itself equipped with a GNSS receiver and/or other methods of determining its geographical location that may work well indoors. For example, a mobile phone may use techniques such as the relative position and signal strength of various cellular base stations and/or known Wi-Fi™ APs in the area to determine its location. Like the previous approach, this also adds uncertainty, as the relative position of the Wi-Fi™ client with respect to the Wi-Fi™ AP is unknown. While technologies such as Wi-Fi™ Certified Location exist, few Wi-Fi™ client devices are certified to work with it. Additionally, at least with a smartphone, it is difficult to envision how an indoor AP location could be updated every 24 hours with zero customer touch.

Additional technologies to determine client location exist, such as Bluetooth Low Energy (BLE) Angle of Arrival (AoA) and Angle of Departure (AoD), but these require further additional radio-frequency hardware, including multiple antennas, to be integrated into a Wi-Fi AP unit, beyond the hardware needed to provide base Wi-Fi functionality.

BRIEF DESCRIPTION OF EMBODIMENTS

As previously discussed, there are deficiencies associated with conventional techniques of providing wireless connectivity to user equipment in an indoor wireless network environment. For example, wireless base stations located indoors typically cannot receive GPS (Global Positioning System) information (such as used for synchronization purposes) from a satellite because such GPS signals are not strong enough to pass through buildings to the respective access point.

Embodiments herein include novel ways of determining a location of wireless access points in a network environment.

More specifically, in one implementation, a communication management resource (such as including a location management resource) receives first location information indicating an absolute location of a communication device. The communication management resource (such as communication management hardware, communication management software, or a combination of communication management hardware and communication management software) also receives a vector value indicating a relative location of a primary wireless access point with respect to the communication device. The communication management resource produces second location information indicating an absolute location of the primary wireless access point based on the first location information and the vector value.

The vector value can be generated in any suitable manner. For example, in one embodiment the communication management resource or other suitable entity can be configured to determine the vector value based at least in part on one or more travel times of wireless communications between the primary wireless access point and the communication device.

In further example embodiments, the vector value is a 3-D position offset vector indicating a distance and angular orientation between the primary wireless access point and the communication device. In one embodiment, the communication device is a secondary wireless access point or other suitable entity with respect to the primary wireless access point.

The first location information can include any suitable information. For example, in one embodiment, the first location information includes: i) a first estimated distance value indicating a first distance between a first satellite and the communication device, ii) a second estimated distance value indicating a second distance between a second satellite and the communication device, iii) a third estimated distance value indicating a third distance between a third satellite and the communication device, iv) a fourth estimated distance value indicating a fourth distance between a fourth satellite and the communication device. Each of the satellites orbits the earth.

Note further that the absolute location (3-D location) of the primary wireless access point in a space can be used for any suitable purpose. For example, in one embodiment, the communication management resource controls a wireless power level of transmitting wireless signals from the primary wireless access point based on the second location information indicating the absolute location (a.k.a., 3-D position, 3-D location, etc.) of the primary wireless access point in the network environment.

In still further example embodiments, the communication management resource as discussed herein communicates the second location information (such as indicating the location of the primary wireless access point) to an allocation management resource (such as an AFC or other suitable entity as previously discussed). In response, the communication management resource receives control input from the allocation management resource. In one embodiment, based on the control input, the communication management resource adjusts a power level of transmitting wireless signals from the primary wireless access point based on the control input received from the allocation management resource.

The first location information can include any suitable information. For example, in one embodiment, the first location information includes first timing signals (such as pseudo-range information) associated with reception of first wireless timing signals received by the communication device from a first set of satellites. In one embodiment, the communication management resource also receives second timing signals (such as pseudo-range information) associated with reception of second wireless timing signals received by the primary wireless access point from a second set of satellites.

In yet further example embodiments, the second timing signals include insufficient information to determine, above a certainty threshold value, the absolute location of the primary wireless access point. Note further that the second set of satellites can be configured to include at least one satellite in the first set of satellites. In other words, the primary wireless access point and the communication device may receive one or more wireless signals transmitted from the same satellite.

Additionally, note that the determination of the location of the primary wireless access point or the communication device can be enhanced via a determination of an altitude of the primary wireless access point above sea level and or announced tune of the communication device above sea level. More specifically, in one embodiment, the communication management resource can be configured to receive first barometric pressure information obtained from a first pressure monitor device disposed at the communication device; the communication management resource receives second barometric pressure information obtained from a second pressure monitor disposed at the primary wireless access point. The communication management resource or other suitable entity can be configured to utilize at least the first barometric pressure information and the second barometric pressure information and other information to determine or confirm the absolute location of the primary wireless access point or at least the relative location of the primary wireless access point with respect to the communication device.

In accordance with still further example embodiments, the communication device is an extender wireless access point with respect to the primary wireless access point. Operation of the extender wireless access point can be controlled by the primary wireless access point. In one embodiment, both the primary wireless access point and the extender wireless access point connect to a respective remote network such as the Internet. The primary wireless access point provides a first set of one or more communication devices (a.k.a., as first user equipment) first wireless connectivity such that the first set of one or more communication devices are able to access the remote network. The communication device for extender wireless access point provides a second set of one or more communication devices (a.k.a., second user equipment) second wireless connectivity such that the second set of one or more communication devices are able to access the remote network.

Note further that both the primary wireless access point and the extender wireless access point may be installed in a same subscriber domain (e.g., domicile, residence, home network, etc.). Thus, the primary wireless access point can be configured to provide first user equipment (one or more mobile communication devices) wireless access to a remote network; the communication device such as an extender wireless access point can be configured to provide second user equipment (one or more mobile communication devices) wireless access to the remote network.

Note further that it may not be possible to determine the absolute location of the primary wireless access point in a geographical space because the primary wireless access point may not receive sufficient wireless signals from corresponding satellites. In one embodiment, the communication management resource produces the second location information indicating the absolute location of the primary wireless access point based on the first location information (such as associated with the communication device) and the vector value in response to detecting an inability of the primary wireless access point to receive sufficient timing signals directly from multiple satellites.

In still further example embodiments, it may be determined by the communication management resource or other suitable entity that an absolute location of the primary wireless access point is uncertain. In response to detecting that a certainty associated with determining the absolute location of the primary wireless access point is below a threshold value, the communication management resource or other suitable entity can be configured to provide notification to move the communication device with hopes that it may be placed in a new location to receive wireless signals from a sufficient number of satellites to determine the absolute location of the communication device. Once the absolute location of the communication device is determined based on better placement of the communication device to receive wireless signals from 4 or more satellites, a combination of the vector value and the known absolute location of the communication device (as derived from wireless signals received from the 4 or more satellites) can be used to the absolute location of the primary wireless access point.

In another one or more example embodiments, a communication management resource (such as including a location management resource) receives a vector value indicating a relative location of a first communication device with respect to a second communication device. The communication management resource further receives: i) first satellite information, the first satellite information generated based on first wireless communications received by the first communication device from a first set of one or more satellites, and ii) second satellite information, the second satellite information generated based on second wireless communications received by the second communication device from a second set of one or more satellites. The communication management resource or other suitable entity generates first location information indicating a 3-D location of the first communication device based on the first satellite information, the second satellite information, and the vector value.

In further example embodiments, the first satellite information includes: i) a first estimated distance value (such as first pseudo-range value) indicating a first estimated distance between a first satellite and the first communication device, ii) a second estimated distance value (such as first pseudo-range value) indicating a second estimated distance between a second satellite and the first communication device. The second satellite information includes: i) a third estimated distance value (such as third pseudo-range value) indicating a third estimated distance between a third satellite and the second communication device, ii) a fourth estimated distance value (such as fourth pseudo-range value) indicating a fourth estimated distance between a fourth satellite and the second communication device. Generation of the first location information indicating the 3-D location (a.k.a., absolute location) of the first communication device further includes: deriving a fifth estimated distance value based on a combination of the vector value and the third estimated distance value, the derived fifth estimated distance value indicating a fifth distance between the first communication device and the third satellite; and deriving a sixth estimated distance value based on a combination of the vector value and the fourth estimated distance value, the derived sixth estimated distance value indicating a sixth distance between the first communication device and the fourth satellite.

Note further that generation of the first location information indicating the 3-D location of the first communication device may further include: determining the 3-D location of the first communication device based on: the first estimated distance value, the second estimated distance value, the derived fifth distance value, and the derived sixth distance value. Thus, the supplemental information such as the derived fifth distance value (such as derived distance value or pseudo-range value indicating an estimated distance between the first communication device and the third satellite), and the derived sixth distance value (such as derived distance value or pseudo-range value indicating an estimated distance between the first communication device and the fourth satellite). Thus, even though the first communication device may not be able to receive wireless signals from the third satellite and the fourth satellite, the distance between the first communication device and the third satellite and the distance between the first communication device and the fourth satellite can be determined and used to determine a location of the first communication device.

Note further that the first communication device may receive wireless signals from 3 or more satellites while the second communication device may be able to receive wireless signals from only one satellite. In such an instance, the first satellite information as discussed herein includes: i) a first estimated distance value (such as first pseudo-range value) indicating a first estimated distance between a first satellite and the first communication device, ii) a second estimated distance value (such as second pseudo-range value) indicating a second estimated distance between a second satellite and the first communication device, and iii) a third estimated distance value (such as third pseudo-range value) indicating a third estimated distance between a third satellite and the first communication device. The second satellite information includes: i) a fourth estimated distance value (such as fourth pseudo-range value) indicating a fourth estimated distance between a fourth satellite and the second communication device. Generation of the first location information indicating the 3-D location of the first communication device includes: deriving a fifth estimated distance value based on a combination of the vector value and the fourth estimated distance value. The derived fifth estimated distance value indicates a fifth estimated distance between the first communication device and the fourth satellite. In such an instance, generation of the first location information further indicates the 3-D location of the first communication device includes: determining the 3-D location of the first communication device based on: the first estimated distance value, the second estimated distance value, the third estimated distance value, and the derived fourth distance value.

In yet further example embodiments, the vector value is a 3-D position offset vector between the first communication device and the second communication device.

The determined locations of the first communication device and the communication device can be used for any suitable purpose. In one embodiment, the communication management resource or other suitable entity controls a wireless power level of transmitting wireless signals from the first communication device based on the determined 3-D location of the first communication device. The communication management resource or other suitable entity controls a wireless power level of transmitting wireless signals from the second communication device based on the determined 3-D location of the second communication device.

As previously discussed, the first communication device and the second communication device can be implemented in any suitable manner. For example, in one embodiment, the first communication device is a primary wireless access point communication device; the second communication device is an extender wireless access point with respect to the primary wireless access point. Operation of the extender wireless access point can be controlled by the primary wireless access point.

Embodiments herein are useful over conventional techniques. For example, as previously discussed, in a first embodiment, a first communication device (such as a primary wireless access point) may not be able to receive any wireless signals transmitted by satellites. A second communication device may be able to receive sufficient wireless signals from multiple satellites to determine a respective geolocation of the second communication device. The location of the first communication device is determined based on knowing a location of the second communication device and a vector value indicating the relative location of the first communication device with respect to the second communication device.

In a second embodiment, a first communication device (such as a primary wireless access point) may not be able to receive a sufficient number of wireless signals transmitted by satellites to determine its 2-D location. A second communication device (such as an extender wireless access point) may not be able to receive a sufficient number of wireless signals transmitted by satellites to determine its 2-D location. The location of the first communication device is determined based on multiple derived pseudo-range values associated with the second communication device receiving wireless signals and a vector value indicating the relative location of the first communication device with respect to the second communication device.

In a third embodiment, a first communication device (such as a primary wireless access point) may be able to receive a sufficient number of wireless signals transmitted by satellites to determine its 2-D location but may or may not be able to determine its 3-D location. A second communication device (such as an extender wireless access point) may not be able to receive a sufficient number of wireless signals transmitted by satellites to determine even its 2-D location. The location of the first communication device is determined based on the satellite signals received by the first communication device and a derived pseudo-range values associated with the second communication device receiving wireless signals and a vector value indicating the relative location of the first communication device with respect to the second communication device.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by computer processor hardware, cause the computer processor hardware (such as one or more co-located or disparately processor devices or hardware) to: receive first location information indicating an absolute location of a communication device; receive a vector value indicating a relative location of a primary wireless access point with respect to the communication device; and produce second location information indicating an absolute location of the primary wireless access point based on the first location information and the vector value.

One embodiment includes a computer readable storage medium and/or system having instructions stored thereon to facilitate synchronization of wireless base stations and respective wireless communications in a network environment. The instructions, when executed by computer processor hardware, cause the computer processor hardware (such as one or more co-located or disparately located processor devices or hardware) to: receive first satellite information, the first satellite information generated based on first wireless signals received by a first communication device; receive second satellite information, the second satellite information generated based on second wireless signals received by a second communication device; and generate first location information indicating a 3-d location of the first communication device based on the first satellite information, the second satellite information, and a vector value indicating a relative location of the first communication device with respect to the second communication device.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

BRIEF DESCRIPTION OF THE DRAWINGS

FIG. 6 is an example diagram illustrating processing of wireless signal information and generation of location information for each of multiple wireless access points according to embodiments herein.

FIG. 8 is an example diagram illustrating processing of wireless signal information and generation of location information for each of multiple wireless access points according to embodiments herein.

FIG. 10 is an example diagram illustrating use of standard pseudo-range values and one or more derived pseudo-range values to calculate a 3-D (absolute) position of a communication device in space according to embodiments herein.

FIG. 12 is an example diagram illustrating a method according to embodiments herein.

FIG. 13 is an example diagram illustrating a method according to embodiments herein.

Figure 1:
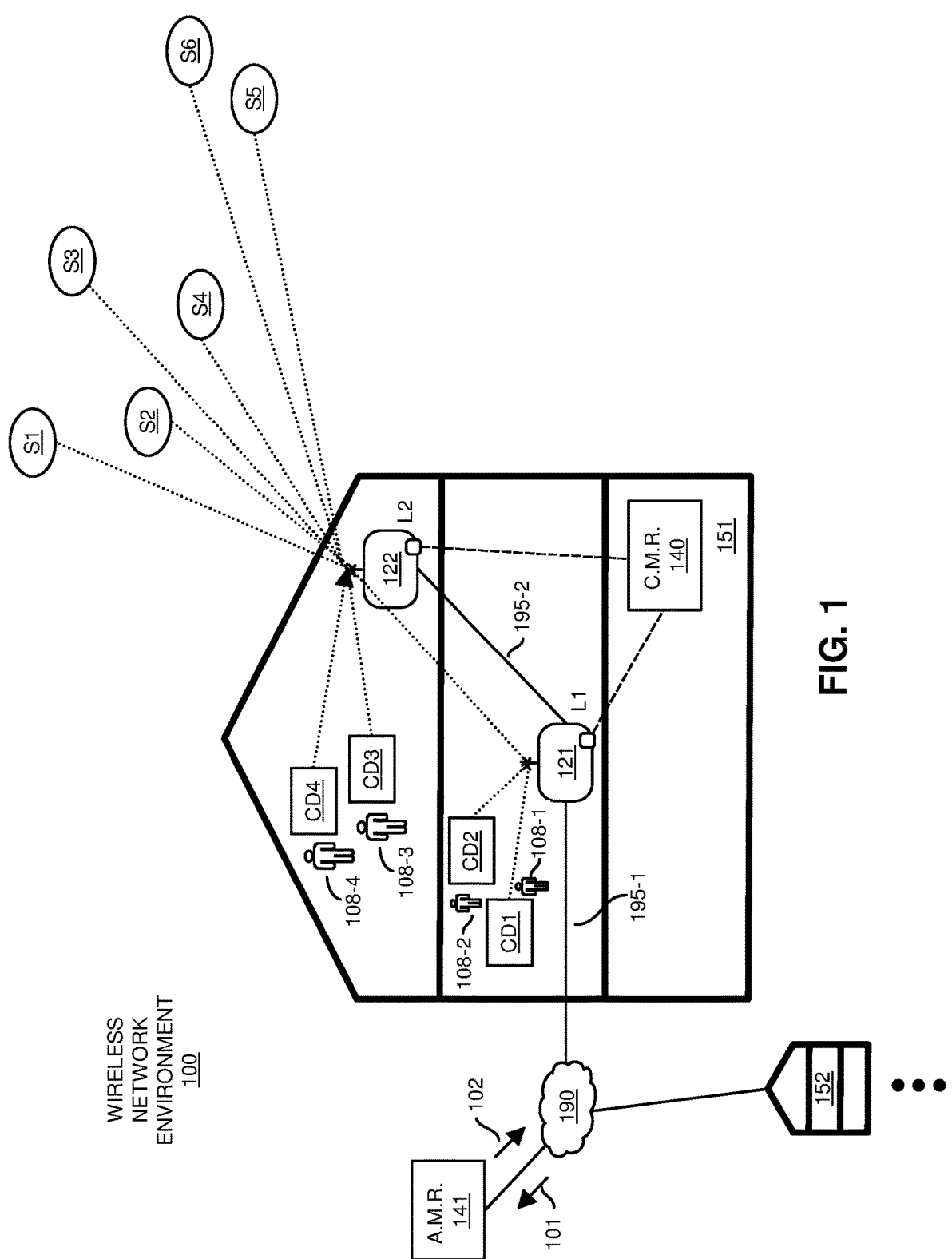
FIG. 1 is an example diagram illustrating a wireless network environment and collection of timing information to determine locations of one or more wireless access points in a network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one configuration, an example communication system includes multiple communication devices such as a primary wireless access point (first communication device) and a secondary wireless access point (second communication device such as a so-called wireless network extender). The primary wireless access point can be configured to control operation of the secondary wireless access point. A communication management resource (such as performing location management functions) associated with the communication system receives first location information indicating a location of the secondary wireless access point. The communication management resource determines a relative position of the primary wireless access point with respect to the secondary wireless access point. Based on the first location information and the determined relative position (such as captured by a vector value), the communication management resource produces (derives) second location information indicating a location of the primary wireless access point.

According to one configuration, an example communication system includes multiple communication devices such as a primary wireless access point (first communication device) and a secondary wireless access point (second communication device such as a so-called wireless network extender). The communication system receives first satellite information generated based on first wireless signals received by a first communication device (such as primary wireless access point). The communication system receives second satellite information, the second satellite information generated based on second wireless signals received by a second communication device (such as second wireless access point). The communication management resource generates first location information indicating a location of the first communication device based on the first satellite information, the second satellite information, and a vector value indicating a relative location of the first communication device with respect to the second communication device.

In further example embodiments, a communication management resource determining indoor AP location fuses location computations from multiple Wi-Fi devices into a single location estimate. In one embodiment, multiple location computations are collected by equipping a primary wireless access point and one or more extender wireless access points, each with their own integrated GNSS receiver and barometric altimeter. Both the primary wireless access point and the one or more extender wireless access points can be equipped with the hardware and firmware components necessary to determine their relative three-dimensional location with a high degree of certainty and to be compliant with Wi-Fi™ Certified Location.

Although the primary wireless access point could be placed at a location convenient to the customer to maximize their wireless coverage or other preferences, if the primary wireless access point is unable to compute and report its geographical location within a threshold level such as 95% confidence level, then one or more extender wireless access points are added to the customer account and placed in locations inside the customer's premises (a.k.a., domicile, subscriber domain, etc.) such that the premises' building materials provide the minimum attenuation possible to GNSS signals (a.k.a., satellite wireless signals), for example, by placing of the one or more extra extender wireless access points next to a window or in an attic area to increase an ability to receive wireless directly from multiple satellites.

In certain embodiments, the location of the indoor primary wireless access point may then be inferred based upon wireless access point information available to both the indoor wireless access point and the extender wireless access points used in the same domicile and thus same account. In particular, in one embodiment, because the primary wireless access point and extender wireless access points are connected via wireless links (such as Wi-Fi™ links), and using Wi-Fi™ Certified Location, the three-dimensional relative position between the primary wireless access point and the extender wireless access points is determined. The primary wireless access point utilizes the monitored wireless GNSS signals, if any, it is able to receive, in addition to the so-called GNSS-derived geographical location information (such as derived pseudo-range information) provided by the extender wireless access point, and the relative position between the primary wireless access point and the extender wireless access point to compute its own geographical absolute location and corresponding location certainty value, and report such information to a channel allocation management resource (such as AFC system) on a daily or other time basis in order to acquire, from the allocation management resource, to a list of 6 GHz-band wireless channels that the primary wireless access point and/or extender wireless access point may use with standard wireless power transmit levels.

Note that wireless clients, such as smartphones, may also contribute their own geographical location information to the communication management resource (location management function) based on their integrated capabilities, including GNSS receivers, cellular base stations, Wi-Fi base service set identifier (BSSID)-based location, integrated barometric altimeters, among other sources—all enhancing or providing location to the wireless access point via sensor fusion. Moreover, if additional information about the intended geographical location of the wireless access point is available, for example from billing, shipping, or cable/fiber backhaul system data, this information can be utilized to verify or enhance the level of confidence in the location derived from the primary wireless access point, one or more extender wireless access points, and/or any wireless client devices.

So-called fusing of indoor location readings (measurements) from multiple devices as proposed herein has multiple benefits. First, the additional cost of adding a range extender (extender wireless access point) to a customer account and corresponding subscriber domain is compensated by the increase in wireless coverage provided by the range extender. In many households where the indoor wireless access point (such as primary wireless access point) is unable to acquire wireless GNSS satellite signals for determining location, a range extender is useful to provide supplemental wireless coverage for the customer. Second, the proposed techniques herein include a zero-touch solution for enabling standard power, meaning that the customer implementing the primary wireless access point and/or extender wireless access point does not need to open a mobile application on a phone to register the indoor wireless access point location or interact with the wireless access points by any other means to register or update the location of the indoor AP. Third, apart from the GNSS receiver integrated into the indoor primary wireless access point and/or the range extender, embodiments herein reuse wireless access point antennas and receivers to triangulate the relative location of the indoor primary wireless access point and the range extender. Additionally, no external connections, antennas, or Internet-of-Things (IoT) radios are needed. Fourth, utilizing direct wireless signal (GNSS) measurements at the customer residence increases the certainty of the indoor location measurement accuracy, allowing the AFC system to identify suitable standard-power channels for the indoor primary wireless access point and/or extender wireless access point with less delay and computational effort, which will help reduce AFC system subscription costs and increase the likelihood that the solution can be FCC-certified.

In summary, embodiments herein include automatically determining the geographical location of one or more indoor wireless access points while allowing flexibility about placement of the primary wireless access point inside the customer premises. For example, the primary wireless access point need not be a location that allows the primary wireless access point to directly receive wireless signals from multiple satellites. Determination of the location of the primary wireless access point and/or extender wireless access point allows allocation of one or more wireless channels using standard transmit power levels without the need for customer intervention or more complex installation.

Now, more specifically, FIG. 1 is an example diagram illustrating a wireless network environment and collection of timing information to determine locations of one or more wireless access points according to embodiments herein.

As shown, wireless network environment 100 and, more specifically, the subscriber domain 151 (a.k.a., domicile, residence, customer premises, etc.) includes multiple wireless access points such as communication device 121 (such as a primary wireless access point), communication device 122 (such as network extender wireless access point), etc.

The communication device 121 can be fixedly installed at location L1; the communication device 122 can be fixedly installed at location L2; and so on.

Each of the communication devices 121 and 122 can be configured to provide wireless connectivity supporting communications with the remote network 190 and corresponding server resources. For example, the communication device 121 (such as primary wireless access point) supports wireless connectivity with first communication devices including communication device CD1 operated by the user 108-1, providing the communication device CD1 connectivity through the communication device 121 over a shared communication link 195-1 to the remote network 190. The communication device 121 supports wireless connectivity with communication device CD2 operated by the user 108-2, providing the communication device CD2 connectivity through the communication device 121 over the shared communication link 195-1 to the remote network 190.

In a similar manner, the communication device 122 (such as second wireless access point) supports wireless connectivity with communication device CD3 operated by the user 108-3, providing the communication device CD3 and corresponding user 108-3 connectivity through the communication device 122 over shared communication link 195-2 and 195-1 to the remote network 190. The communication device 122 supports wireless connectivity with communication device CD4 operated by the user 108-4, providing the communication device CD4 and corresponding user 108-4 connectivity through the communication device 122 over shared communication link 195-2 and 195-1 to the remote network 190.

As further shown, the subscriber domain 151 includes a communication management resource 140 implemented at one or more locations such as communication device 121, communication device 122, etc., in the subscriber domain 151. For example, one or more functions associated with the communication management resource 140 can be implemented at the communication device 121; one or more functions associated with the communication management resource 140 can be implemented at the communication device 122; and so on.

The wireless network environment 100 further includes the allocation management resource 141 (such as an AFC or other suitable entity). In one embodiment, the allocation management resource monitors use of wireless access points in each of the subscriber domains 151, 152, etc. In further example embodiments, each of the wireless access points in the subscriber domains communicates their location to the allocation management resource 141. The allocation management resource 141 tracks the locations of the different wireless access points used in the subscriber domains and allocates one or more wireless channels for use by the wireless access points so that use of allocated wireless channels by the wireless access points do not cause wireless interference with each other.

Note that any of the resources as described herein include hardware or software resources (or a combination of both) in which to carry out respective operations. For example, allocation management resource 141 can be configured to include allocation management hardware, allocation management software, or a combination of allocation management hardware and allocation management software; communication management resource 140 can be configured to include communication management hardware, communication management software, or a combination of communication management hardware and communication management software; and so on.

As discussed herein, the location of the communication devices 121, 122, etc., can be determined in any suitable manner. In one embodiment, the wireless network environment 100 includes one or more satellites S1, S2, S3, S4, S5, S6, etc., disposed at known orbital positions with respect to the earth. Each of the satellites communicates wireless signals (such as GNSS signals) in the wireless network environment 100. As further discussed herein, one or more of the communication devices 121 and 122 receives the wireless signals transmitted from the respective satellites S1, S2, S3, S4, S5, S6, etc., and produces respective pseudo-range information. Device capable of receiving and decoding GNSS signals broadcast from GNSS satellites. A GNSS receiver is able to estimate its geographical latitude and longitude if it receives and decodes GNSS signals from at least 3 GNSS satellites, and it is additionally able to determine is altitude if it receives and decodes GNSS signals from at least 4 GNSS satellites.

Note further that each of the communication devices 121, 122, etc., can be configured to support wireless connectivity and determination of relative locations with respect to each other. For example, the communication device 121 can be configured to wirelessly communicate with the communication device 122. Conversely, the communication device 122 can be configured to wirelessly communicate with the communication device 121. In one embodiment, one or more of the communication devices 121 and 122 and/or communication management resource 140 support implementation of a location management function that produces a vector value indicating relative location of one communication device with respect to the other communication device.

Operation I: Initial Primary Wi-Fi AP Placement

In one embodiment, the customer of subscriber domain 151 places the communication device 121 at location L1 such as a location where the customer or installer deems it most convenient for supporting wireless connectivity.

Operm II: Primary Wi-Fi AP Attempts Geolocation

The communication device 121 (such as primary wireless access point) uses its GNSS receiver (such as in communication management resource or other suitable entity) to listen for wireless signals from GNSS satellites. The communication device 121 attempts to compute its own geographic location, if possible, from the one or more wireless signals received from satellites S1, S2, S3, S4, S5, S6, etc., and their known satellite orbital locations.

If the communication device 121 is able to compute its location L1 with sufficient certainty of at least 95% or other suitable value, then the communication device 121 reports its location L1 and corresponding certainty level to the allocation management resource 141 (such as AFC system). In such an instance processing continues at operation IV below. However, if the communication management resource 140 is unable to determine the location of the communication device 121 because it cannot receive any wireless signals from the satellites, or is only able to determine the location of the communication device 121 with less than 95% certainty, then the communication management resource 140 or other suitable entity instructs the customer to obtain/install a communication device 122 (such as extender wireless access point). The communication device 122 includes an integrated GNSS receiver and is placed close to a window or in an attic and is able to receive wireless signals from one or more of the satellites S1, S2, S3, S4, S5, S6, etc. The communication device 122 is connected via a Wi-Fi™ link to the primary wireless access point (communication device 121).

In one embodiment, the allocation management resource 141 is an Automated Frequency Coordination (AFC) System. The AFC is a system mandated by the FCC to be accessed by any unlicensed device to find out which channels in the 6 GHz band (U-NII-5: 5.925-6.425 GHz; U-NII-7: 6.525-6.875 GHz) it may utilize with standard power (up to 23 dBm/MHz EIRP) at its specific geographical location. Without accessing AFC, an unlicensed device may only use low-power mode (up to 5 dBm/MHz EIRP) on the band. AFC systems may be privately-operated by entities certified by the FCC.

In this example embodiment, the (Global Navigation Satellite System) Global Positioning GNSS system includes multiple satellites S1, S2, S3, S4, S5, S6, etc., orbiting the Earth. There are four GNSS: GPS, GLONASS, BeiDou, and Galileo. Each system has global service coverage. Each GNSS satellite has its onboard clock synchronized to a reference ultra-high-precision atomic clock on Earth. Each satellite broadcasts information such as its precise time onboard, its own precise orbit (ephemeris), the rough orbits (locations) of all satellites in the system (almanac), and other information. The GNSS receiver (such implemented via communication management resource 140 in the communication device 121 and the data communication device 122), if it is able to receive and decode the wireless signals from at least four of the satellites S1, S2, S3, S4, S5, S6, etc., computes its own geographical location (absolute position) in three dimensions (latitude, longitude, and altitude) using the difference in reported times from each satellite (space-time relativity) and the expected location of each satellite in its orbit according to the almanac and ephemeris.

Operation III: Wi-Fi Extender Attempts Geolocation and Wi-Fi Location Determines AP-Extender Relative Position The communication device 122 (such as Wi-Fi extender) listens for GNSS signals and attempts to compute its own geographic location. The primary AP uses Wi-Fi Certified Location function to determine the relative position of the Wi-Fi extender (communication device 122) with respect to itself (communication device 121). The Wi-Fi extender's geographic location information is combined with the relative AP-extender position information to determine the primary Wi-Fi AP's geographical location and its level of certainty. If the level of location certainty is at least 95%, the location and level of certainty are reported to the AFC system. Otherwise, the customer is instructed to move the Wi-Fi extender closer to where it is closer to line-of-sight of the sky, and therefore GNSS satellites.

Operation IV: FC

The primary AP (communication device 121) reports its geographic location and level of certainty to the AFC system. The AFC system provides the primary AP and extender with a list of channels that they may both use with standard power in the 6 GHz band.

Figure 2:
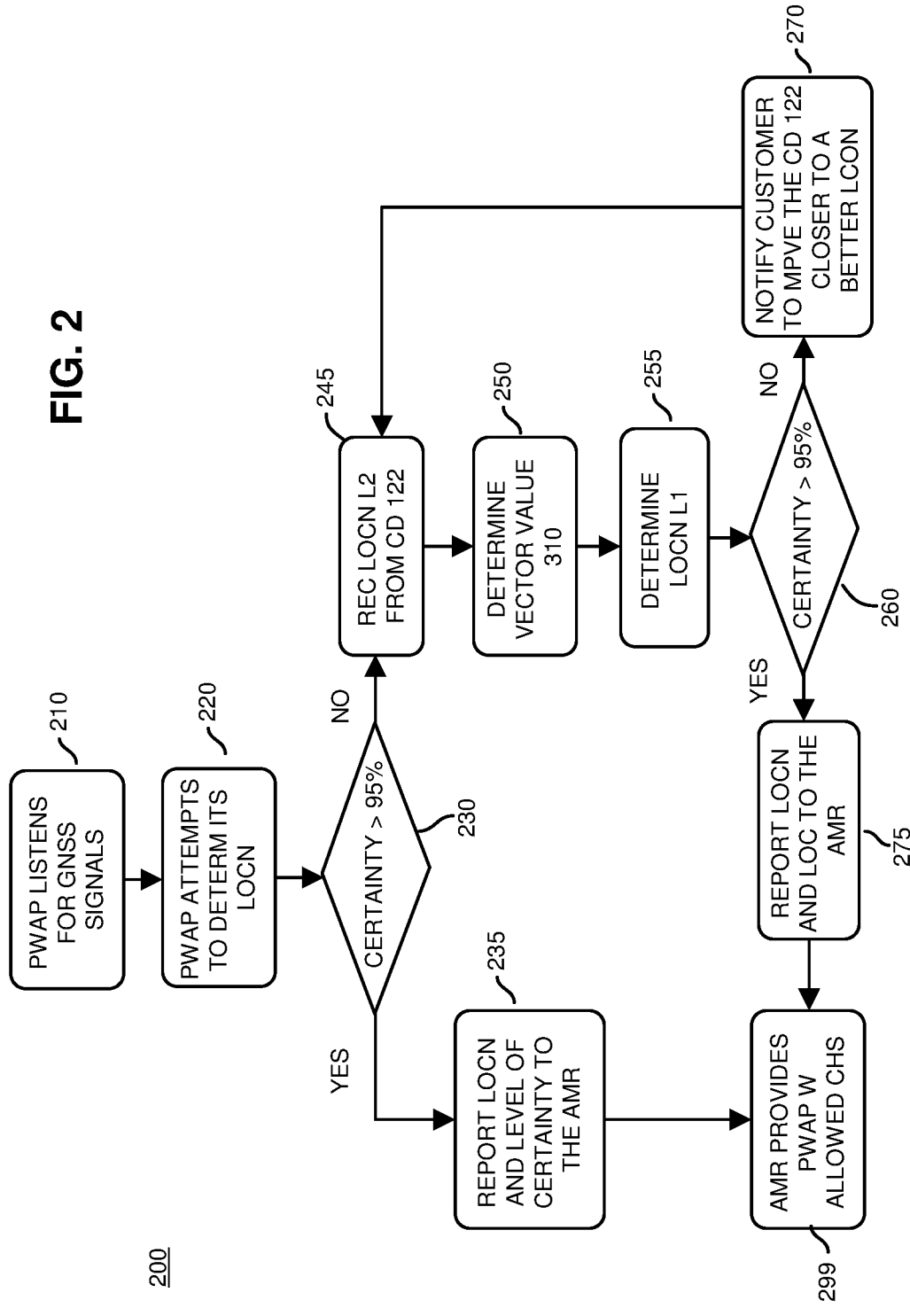
FIG. 2 is an example diagram illustrating a flowchart of implementing location management according to embodiments herein.

FIG. 2 is an example diagram illustrating a flowchart of implementing location management according to embodiments herein.

As shown in flowchart 200, in processing operation 210, the communication device 121 (such as PWAP or primary wireless access point) monitors for wireless signals transmitted from the one or more satellites.

In processing operation 220, the communication management resource 140 associated with the communication device 121 attempts to determine the location L1 of the communication device 121 based on one or more received wireless signals from the satellites. As previously discussed, the communication device 121 may or may not be able to receive any wireless signals from satellites.

In processing operation 230, the communication management resource 140 determines a respective certainty (such as a percentage value between 0 and 100) of any generated location information indicating the location L1 of the communication device 121. The communication management resource 140 compares the certainty of the generated location information to a respective threshold value such as 95 percent or other suitable value. In response to detecting that the certainty of the location of the communication device 121 is above the threshold level of 95 percent (such as high level of certainty), the communication management resource 140 implements processing operation 235.

In processing operation 235, the communication management resource 140 communicates the determined location L1 of the communication device 121 and corresponding level of certainty to the allocation management resource 141.

In processing operation 299, based upon the known location L1 of the communication device 121, the allocation management resource 141 allocates one or more wireless channels for use by the communication device 121 and/or communication device 122 in the subscriber domain 151.

It is possible in processing operation 230 that the communication management resource 140 or other suitable entity determines that any generated location information associated with the communication device 121 is below the respective threshold level of 95 percent certainty. In such an instance, processing flow continues at operation 245.

In processing operation 245, the communication management resource receives an absolute location L2 indicating the location of the communication device 122. The location L2 of the communication device 122 can be determined in any suitable manner. As further discussed herein, in one embodiment, the communication management resource 140 associated with the communication device 122 determines the location of communication device 122 based on wireless signals received from one or more satellites in the wireless network environment 100.

In processing operation 250, the communication management resource 140 determines a vector value 310. In one embodiment, the vector value is a 3-D position offset vector indicative of: i) an estimated distance between the communication device 122 and the communication device 121 (such as primary wireless access point), and ii) an angular orientation of the communication device 121 with respect to the communication device 122.

In processing operation 255, the communication management resource 140 determines a location L1 of the communication device 121 based on a combination of the determined location of the communication device 122 and the vector value.

In processing operation 260, the communication management resource 140 determines if the generated location information L1 is accurate above a threshold certainty level such as 95 percent. In response to a condition in which the certainty of the generated location L1 of the communication device 121 is below 95 percent, processing continues at operation 270.

In processing operation 270, the communication management resource 140 or other suitable entity notifies the customer or installer of the communication devices in the subscriber domain 151 to move the communication device 122 to a better location so that it is able to receive wireless signals from the satellites.

Alternatively, if the communication management resource 140 determines that the determined location of the communication device 122 in processing operation 255 is greater than the certainty threshold level of 95 percent, the communication management resource executes operation 275.

In processing operation 275, the communication management resource 140 communicates the determined location L1 of the communication device 121 and/or location L2 of the communication device 122 to the allocation management resource 141.

In processing operation 299, based upon the known location L1 of the communication device 121, the allocation management resource 141 allocates one or more wireless channels for use by the communication device 121 in the subscriber domain 151. Based upon the known location L2 of the communication device 122 and corresponding level of certainty, the allocation management resource 141 allocates one or more wireless channels for use by the communication device 122 in the subscriber domain 151.

Figure 3:
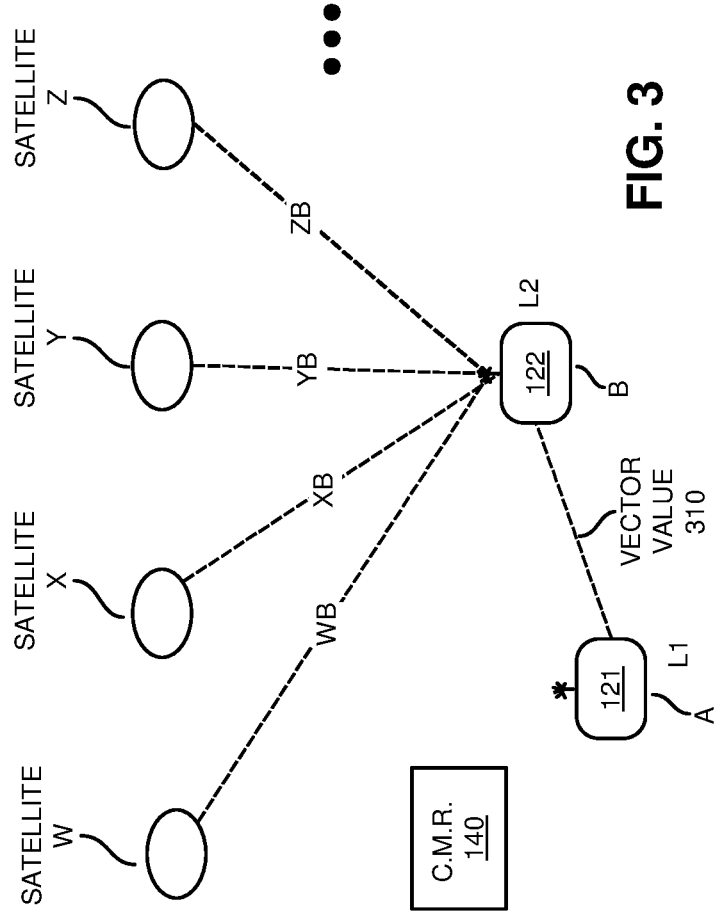
FIG. 3 is an example diagram illustrating monitoring of wireless signals to determine a location of a first communication device and deriving a location of a second communication device based on a vector value and the determined location of the first communication device according to embodiments herein.

FIG. 3 is an example diagram illustrating monitoring of wireless signals to determine a location of a first communication device and deriving a location of a second communication device based on a vector value and the determined location of the first communication device according to embodiments herein.

In this example embodiment, the communication device 122 (also known as device B, extender wireless access point, etc.) receives wireless signal WB transmitted from the satellite W; the communication device 122 receives wireless signal XB transmitted from the satellite X; the communication device 122 receives wireless signal YB transmitted from the satellite Y; the communication device 122 receives wireless signal ZB transmitted from the satellite Z; and so on.

Based on the received wireless signals WB, XB, YB, and ZB, (and corresponding pseudo-range information associated with each of the received wireless signals WB, XB, YB, and ZB), the communication management resource 140 implements a GPS function to determine the location L2 of the communication device 122.

As discussed herein, pseudo-range (or also known as the direct pseudo range) is the apparent range between a GNSS satellite (such as satellite W, satellite X, satellite Y, satellite Z, etc.) and a respective GNSS receiver (such as in communication device 121, communication device 122, etc.), which may or may not match actual geometric distance between the communication device and the satellite.

$$R_P = \rho + c(dt_r - dt^s) + T + \alpha_f STEC + K_{P,r} - K_P{}^S + M_P + \varepsilon_P,$$
where $\rho$(m) is the geometric range between the satellite and receiver antenna phase centers at emission and reception time, respectively, $c$=299792458 m/s is the speed of light in a vacuum, $dt_r$(m) is the receiver clock offset from the GNSS time scale $dt^s$(m) is the satellite clock offset from the GNSS time scale, including the relativistic satellite clock correction, T is the tropospheric delay, $\alpha_f STEC$ (m) is the frequency-dependent ionospheric delay term, where $\alpha_f$ is the conversion factor between the integrated electron density along the ray path STEC, and the signal delay at frequency f (Hz), where $$a_f = \frac{40.3}{f^2} 10^{16} m/TECU,$$

where,

TECU=$10^{16}$ e$^-$/m$^2$ is the total electron content unit, $K_{P,r}$(m) is the receiver instrumental delay, $K_P{}^S$(m) is the satellite instrumental delay, $M_P$(m) is the multipath delay, and $\varepsilon_P$(m) is the delay due to receiver noise.

Additionally, the communication management resource 140 implements a location management function to generate vector value 310 such as a 3-D position offset vector indicative of: i) an estimated distance between the communication device 122 and the communication device 121 (such as primary wireless access point), and ii) an angular orientation (in 3-D space) of the communication device 121 with respect to the communication device 122.

Figure 4:
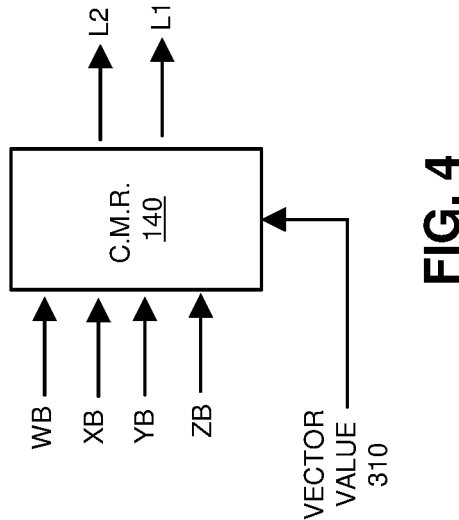
FIG. 4 is an example diagram illustrating processing of wireless signal information and generation of location information for each of multiple wireless access points according to embodiments herein.

FIG. 4 is an example diagram illustrating processing of wireless signal information and generation of location information for each of multiple wireless access points according to embodiments herein.

In this example embodiment, a location management function associated with the communication management resource 140 receives location information L2 indicating an absolute location (such as one or more of latitude, longitude, and altitude) of the communication device 122 in the wireless network environment. As previously discussed, the location L2 can be determined by the communication management resource 140 or other suitable entity via the pseudo-range information derived from wireless signals WB, XB, YB, and ZB (such as GNSS signals used to determine a distance from a respective known location of a satellite to the communication device 122).

In this example embodiment, a location management function associated with the communication management resource 140 receives location information L2 indicating an absolute location (such as one or more of latitude, longitude, and altitude) of the communication device 122 in the wireless network environment.

The location management function of the communication management resource 140 also receives the vector value 310 indicating a relative location of the communication device 121 with respect to the communication device 122. The location management function of the communication management resource 140 produces second location information L1 indicating an absolute location of the communication device 121 based on the location information L2 and the vector value 310.

As previously discussed, the vector value can be generated in any suitable manner. For example, in one embodiment the communication management resource 140 or other suitable entity determines the vector value 310 based at least in part on one or more of: i) travel time of wireless communications transmitted between the communication device 121 and the communication device 122, and ii) an angular direction of receiving the wireless communications at the communication device 121 and/or communication device 122.

Note again that the first location information associated with wireless signals WB, XB, YB, and ZB can include any suitable information. For example, in one embodiment, the first location information includes first timing signals (such as pseudo-range information) associated with reception of first wireless timing signals WB, XB, YB, and ZB received by the communication device from a first set of satellites (W, X, Y and Z).

For example, in one embodiment, the first location information includes timing information indicating: i) a first value indicating a first estimated distance (based on first pseudo-range information derived from signal WB) between the satellite W and the communication device 122, ii) a second value indicating a second estimated distance (based on second pseudo-range information derived from signal XB) between the satellite X and the communication device 122, iii) a third value indicating a third estimated distance (such as based on third pseudo-range information derived from signal YB) between the satellite Y and the communication device 122, iv) a fourth value indicating a fourth estimated distance (such as based on fourth pseudo-range information derived from signal ZB) between the satellite Z and the communication device 122.

As previously discussed, the determined absolute location of the communication device 121 can be used for any suitable purpose. For example, in one embodiment, the communication management resource 140 controls a wireless power level of transmitting wireless signals from the communication device 121 to the communication devices CD1, CD2, etc., based on the location information L1 indicating the absolute location (a.k.a., 3-D position, 3-D location, etc.) of the communication device 121 in the wireless network environment 100.

Also, as previously discussed, it may not be possible to determine the absolute location L1 of the communication device 121 because the communication device 121 may not receive sufficient wireless signals from enough corresponding satellites. In such an instance, the communication management resource 140 produces the location information L1 indicating the absolute location of the communication device 121 based on the location information L2 (such as associated with the communication device) and the vector value 310 in response to detecting an inability of the communication device 121 to receive sufficient satellite timing signals (pseudo-range information) directly from multiple satellites.

Note further that the determination of the location of the communication device 121 or the communication device 122 can be enhanced via a determination of an altitude of the respective communication device above sea level. More specifically, in one embodiment, the communication management resource 140 can be configured to receive first barometric pressure information obtained from a first pressure monitor device disposed at the communication device 121; the communication management resource 140 can be configured to receive second barometric pressure information obtained from a second pressure monitor disposed in the communication device 122. The communication management resource 140 or other suitable entity can be configured to utilize the first barometric pressure information to determine an altitude of the communication device 121; and the communication management resource 140 uses the second barometric pressure information to determine or confirm the altitude of the absolute location of the primary wireless access point or at least the relative location of the communication device 121 with respect to the communication device 122.

In accordance with still further example embodiments, as previously discussed, the communication device 122 is a so-called extender wireless access point with respect to the communication device 121 (such as primary wireless access point). Operation of the extender wireless access point can be controlled by the primary wireless access point. Both the primary wireless access point and the extender wireless access point connect to a respective remote network 190 such as the Internet via a serial communication link 195. The primary wireless access point provides a first set of one or more communication devices CD1, CD2, (a.k.a., as first user equipment) first wireless connectivity such that the first set of one or more communication devices are able to access the remote network 190 via serial communication link 195-1. The communication device 122 or extender wireless access point provides a second set of one or more communication devices CD3, CD4, (a.k.a., second user equipment) second wireless connectivity such that the second set of one or more communication devices is able to access the remote network 190 over serial communication links 195-2 and 195-1.

The primary wireless access point and the extender wireless access point may be installed in a same subscriber domain 151 (e.g., domicile, residence, home network, etc.). Thus, the communication device 121 can be configured to provide first user equipment wireless access to a remote network 190; the communication device such as an extender wireless access point can be configured to provide second user equipment wireless access to the remote network 190.

In still further example embodiments, it may be determined by the communication management resource 140 or other suitable entity that a determined absolute location L1 of the communication device 121 is uncertain. In response to detecting that a certainty associated with determining the absolute location of the communication device 121 is below a threshold value, the communication management resource 140 or other suitable entity can be configured to provide notification to the wireless access point installer associated with communication device 121 or communication device 122 to move the communication device 121 or communication device 122 to a new location with hopes that the communication devices may be placed in a new location to receive wireless signals from a sufficient number of satellites to determine the absolute location of the communication device 121 based on received satellite signals. In such an instance, once the absolute location of the communication device 121 is determined based on placement of the communication device 121 to receive wireless signals from 4 or more satellites, a combination of the vector value 131 and the known absolute location of the communication device 122 (as derived from wireless signals received from the 4 or more satellites) can be used to the absolute location L1 of the communication device 121.

In still further example embodiments, the communication management resource 140 communicates the location information L1 (indicating the location of the communication device 121) such as via signal 101 (in FIG. 1) to an allocation management resource 141. In response, the communication management resource 140 receives control input 102 (see FIG. 1, such as wireless transmit control information) from the allocation management resource 141. Referring again to FIG. 4, based on the control input 102, the communication management resource 140 adjusts a power level of transmitting wireless signals from the communication device 121 based on the control input received from the allocation management resource 141. Thus, the allocation management resource 141 and communication management resource 140 control which carrier frequencies are used by the communication device 121 and/or the wireless transmit power level of the communication device 121 communicating with one or more of communication devices CD1, CD2, etc.

Figure 5:
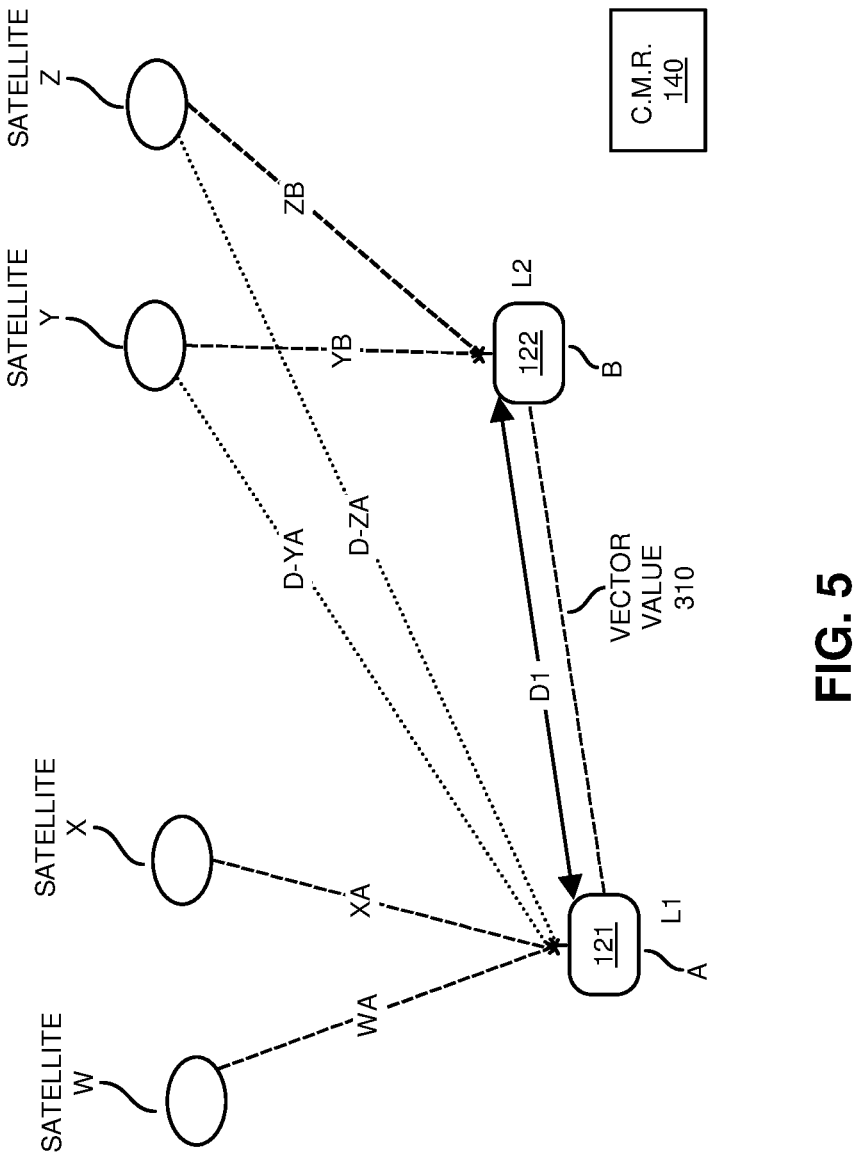
FIG. 5 is an example diagram illustrating monitoring of wireless signals to determine a location of a first communication device and a second communication device according to embodiments herein.

FIG. 5 is an example diagram illustrating monitoring of wireless signals to determine a location of a first communication device and a second communication device according to embodiments herein.

In this example embodiment, the communication device 122 receives wireless signal YB transmitted from the satellite Y; the communication device 122 receives wireless signal ZB transmitted from the satellite Z; and so on. Assume that the pseudo-range information associated with the signal YB and the signal ZB is insufficient information for the communication management resource 140 to determine an absolute location L2 of the communication device 122. However, as further discussed below, this information can be used to generated so-called derived pseudo-range range information that is used to determine a location of the communication device 121.

Further in this example embodiment, note that the communication device 121 receives wireless signal WA transmitted from the satellite W; the communication device 121 receives wireless signal XA transmitted from the satellite X; and so on. As previously discussed, the pseudo-range information associated with the signal WA and the signal XA alone is insufficient information for the communication management resource 140 to determine an absolute location of the communication device 121.

Additionally, in a similar manner as previously discussed, the communication management resource 140 implements a location management function to generate vector value 310 such as a 3-D position offset vector indicative of: i) an estimated distance D1 between the communication device 122 and the communication device 121 (such as primary wireless access point), and ii) an angular orientation (in 3-D space) of a location of the communication device 121 with respect to a location of the communication device 122.

FIG. 6 is an example diagram illustrating processing of wireless signal information and generation of location information for each of multiple wireless access points according to embodiments herein.

In this example embodiment, the communication management resource 140 (such as including a location management resource) receives a vector value 310 indicating a relative location of the communication device 121 with respect to the communication device 122. As previously discussed, the communication management resource 140 further receives: i) first satellite information such as pseudo-range information (such as estimated distance) associated with wireless signals WA, XA; the first satellite information is generated based on first wireless communications received by the communication device 121 from a first set of satellites (satellite W and satellite X), and ii) second satellite information, such as pseudo-range information associated with wireless signals YB, ZB; the second satellite information is generated based on second wireless communications received by the communication device 122 from a second set of satellites (satellite Y and satellite Z).

As further discussed below, the communication management resource 140 or other suitable entity determines the location L1 and generates corresponding location information indicating a 3-D location of the communication device 121 based on the first satellite information, the second satellite information, and the vector value 310.

In one embodiment, the first satellite information includes or can be used to determine: i) a first estimated distance value (such as first pseudo-range value derived from wireless signal WA) indicating a first estimated distance between the first satellite W and the communication device 121, ii) a second estimated distance value (such as second pseudo-range value derived from wireless signal XA) indicating a second estimated distance between a satellite X and the communication device 121.

The second satellite information includes: i) a third estimated distance value (such as third pseudo-range value derived from wireless signal YB) indicating a third estimated distance between a third satellite Y and the communication device 122, ii) a fourth estimated distance value (such as fourth pseudo-range value derived from wireless signal ZB) indicating a fourth estimated distance between a fourth satellite Z and the communication device 122.

In such an instance, generation of the first location information L1 indicating the 3-D location (a.k.a., absolute location) of the first communication device 121 includes, via the communication management resource 140: deriving a fifth estimated distance value D-YA based on a combination of the vector value 310 and the third estimated distance value associated with signal YB, the derived fifth estimated distance value D-YB indicates a fifth distance between the communication device 121 and the third satellite Y; and deriving a sixth estimated distance value D-ZA based on a combination of the vector value 310 and the fourth estimated distance value associated with signal ZB; the derived sixth estimated distance value D-ZB indicates a sixth distance D-ZB between the communication device 121 and the fourth satellite Z.

As further discussed herein, the generation of the pseudo-range information (estimated distance D-YB) between the satellite Y and the communication device 121 and generation of the pseudo-range information (estimated distance D-ZB) between the satellite Z and the communication device 121 enables the communication management resource 140 to determine the location L1 of the communication device 121. In other words, the pseudo-range information associated with WA, XA, D-YA, and D-ZA is sufficient for the communication management resource 140 to accurately determine the location L1 of the communication device 121. The pseudo-range information (estimated distance) associated with signals D-YA and D-ZA provide supplemental distance information as if the communication device 121 wirelessly received the signals transmitted by the satellite Y and satellite Z.

More specifically, generation of the first location information indicating the 3-D location L1 of the first communication device 121 may further include, via a location management function implemented by the communication management resource 140: determining the 3-D location L1 of the first communication device 121 based on: the first estimated distance value (estimated distance between the satellite W and communication device 121 based on WA), the second estimated distance value (estimated distance between the satellite X and communication device 121 based on XA), the derived fifth distance value (estimated distance between the satellite Y and communication device 121 based on D-YA), and the derived sixth distance value (estimated distance between the satellite Z and communication device 121 based on D-ZA). Thus, the supplemental information such as D-YA and D-ZA enables the communication management resource 140 to accurately determine the location L1 even though the communication device 121 is unable to receive wireless signals from each of the satellites Y and Z.

Thus, even though the first communication device 121 may not be able to receive wireless signals from the satellite Y and the satellite Z, the distance between the first communication device 121 and the satellite Y can be estimated and the distance between the satellite Z and the communication device 121 can be estimated and used to determine a location L1 of the first communication device 121.

In one embodiment, the communication management resource 140 determines the estimated distance (associated with D-YB) between the communication device 121 and the satellite Y via trigonometry. For example, the distance D1 between the communication device 121 and the communication device 122 is known based on vector value 310 (based on measured time duration between a time of a wireless communication sent by the communication device 121 and a time of the communication device 122 receiving the transmitted wireless signal or based on measured time between a time of a wireless communication sent by the communication device 122 and a time of the communication device 121 receiving the transmitted wireless signal or a combination of both).

The communication management resource 140 determines the angle 611 between the vector value 310 and the vector YB based at least in part on vector value 310. The communication management resource 140 uses distance D1, angle 611, and estimated distance associated with YB to determine/derive the distance D-YA. As further discussed below, the communication management resource 140 can be configured to determine the angle 611 (angle ABY) in any suitable manner in order to derive the pseudo-range information D-YA.

The communication management resource 140 can be configured to determine the angle 612 between the vector value 310 and the vector ZB based on vector value 310 based at least in part on the vector value 310. The communication management resource 140 uses distance D1, angle 612, and estimated distance associated with ZB to determine/derive the distance D-YA. As further discussed below, the communication management resource 140 can be configured to determine the angle 612 (angle ABZ) in any suitable manner in order to derive the pseudo-range information D-ZA.

As previously discussed, the determined locations L1 and L2 respectfully of the first communication device and the communication device can be used for any suitable purpose. In one embodiment, the communication management resource 140 or other suitable entity controls a wireless power level of transmitting wireless signals from the first communication device 121 based on the determined 3-D location of the first communication device. The communication management resource 121 or other suitable entity controls a wireless power level of transmitting wireless signals from the second communication device based on the determined 3-D location of the second communication device. Also as previously discussed, the communication management resource and/or the allocation management resource 141 can be configured to control use of wireless carrier frequencies that are allocated for use by the communication devices.

Figure 7:
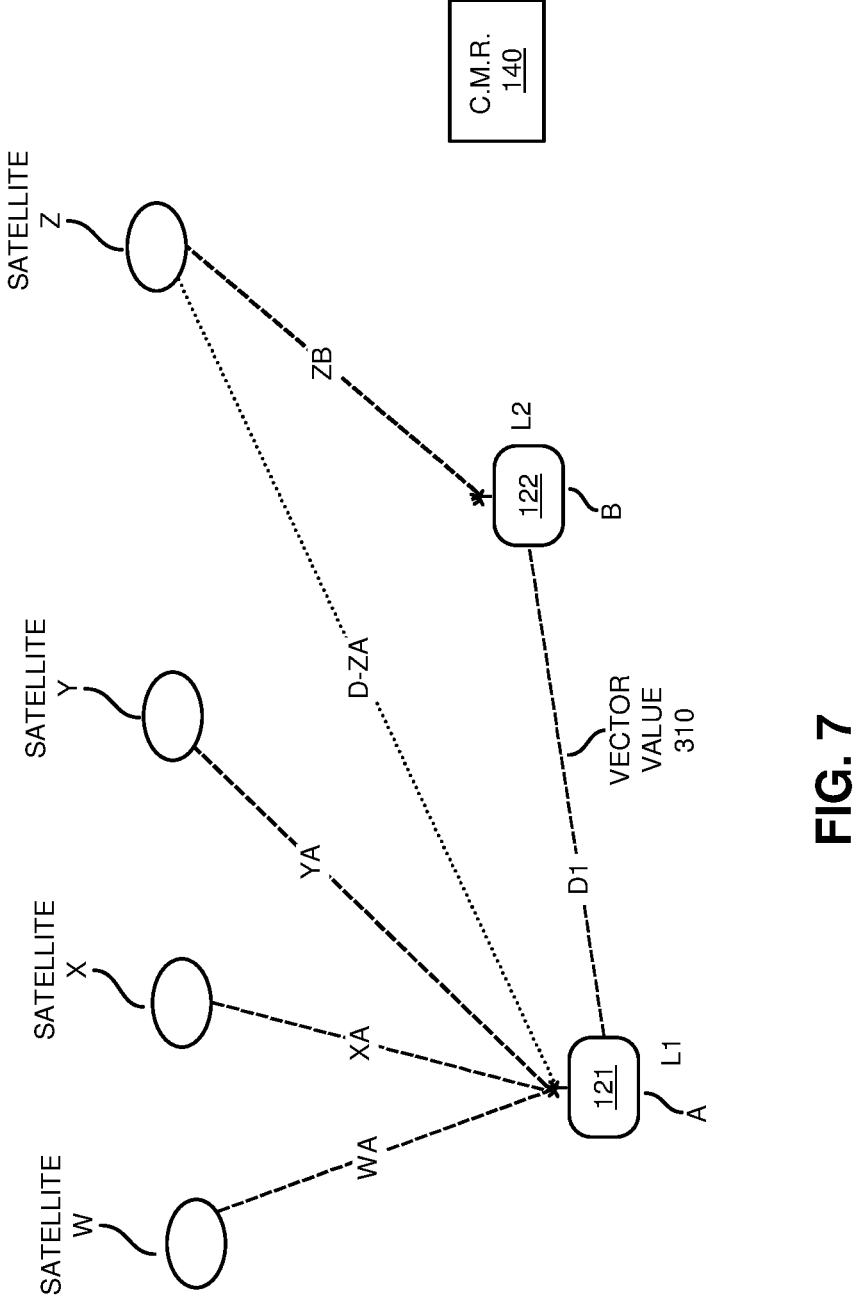
FIG. 7 is an example diagram illustrating monitoring of wireless signals to determine a location of a first communication device and a second communication device according to embodiments herein.

FIG. 7 is an example diagram illustrating monitoring of wireless signals to determine a location of a first communication device and a second communication device according to embodiments herein.

In this example embodiment, the communication device 122 receives wireless signal ZB transmitted from the satellite Z. The pseudo-range information associated with the signal ZB is insufficient information for the communication management resource 140 to determine an absolute (3-D) location L2 or 2-D location of the communication device 122. However, as further discussed below, this information can be used to derive pseudo-range range information D-ZA that is used to determine a location of the communication device 121.

Further in this example embodiment, the communication device 121 receives wireless signal WA transmitted from the satellite W; the communication device 121 receives wireless signal XA transmitted from the satellite X; the communication device 121 receives wireless signal YA transmitted from the satellite Y. The pseudo-range information associated with the signals WA, XA, and YA are insufficient information for the communication management resource 140 to determine an absolute location of the communication device 121.

Additionally, in a similar manner as previously discussed, the communication management resource 140 implements a location management function to generate vector value 310 such as a 3-D position offset vector indicative of: i) an estimated distance between the communication device 122 and the communication device 121 (such as primary wireless access point), and ii) an angular orientation of the communication device 121 with respect to the communication device 122.

Figure 8:
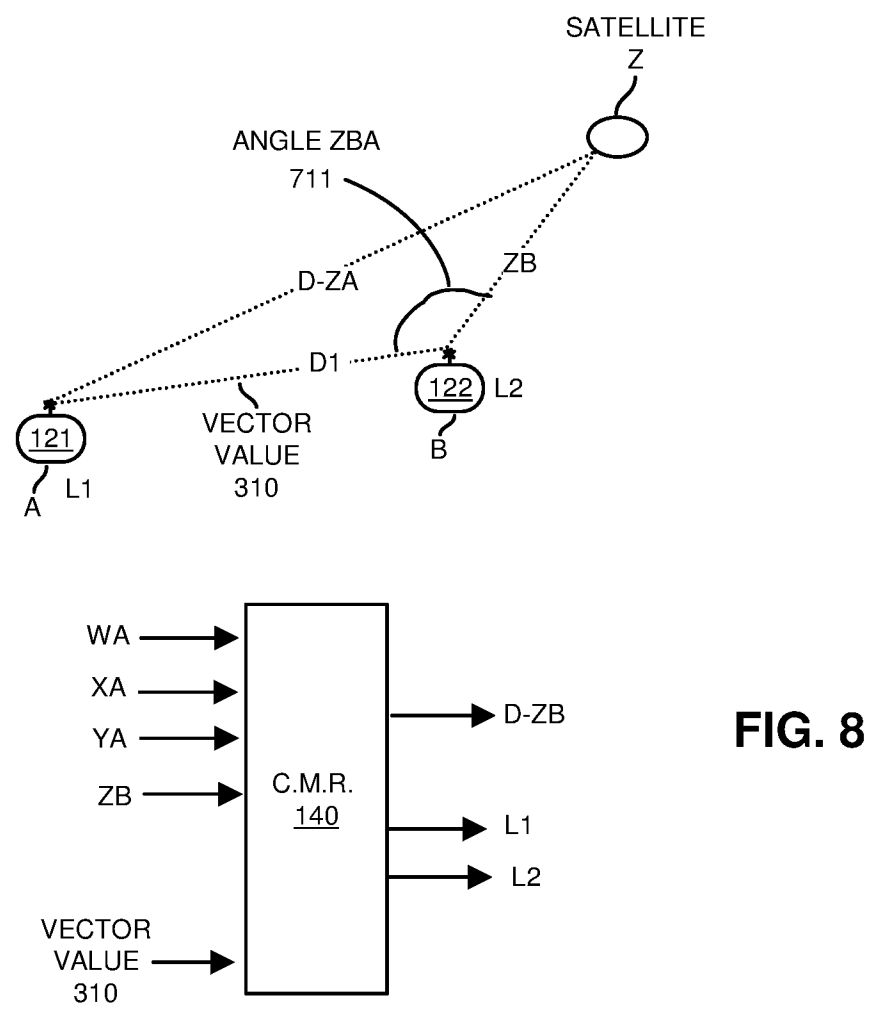

FIG. 8 is an example diagram illustrating processing of wireless signal information and generation of location information for each of multiple wireless access points according to embodiments herein.

Note further that the first communication device may receive wireless signals from 3 satellites while the second communication device may be able to receive wireless signals from only one satellite. In such an instance, the first satellite information as discussed herein includes: i) a first estimated distance value (such as first pseudo-range value) indicating a first estimated distance between a satellite W and the first communication device 121, ii) a second estimated distance value (such as second pseudo-range value) indicating a second estimated distance between a satellite X and the first communication device 121, and iii) a third estimated distance value (such as third pseudo-range value) indicating a third estimated distance between a third satellite Y and the first communication device 121. The second satellite information includes: i) a fourth estimated distance value (such as fourth pseudo-range value) indicating a fourth estimated distance between a fourth satellite Z and the second communication device 122. Generation of the location information L1 indicating the 3-D location of the first communication device may include: deriving a fifth estimated distance value D-ZA as further discussed below.

Figure 9:
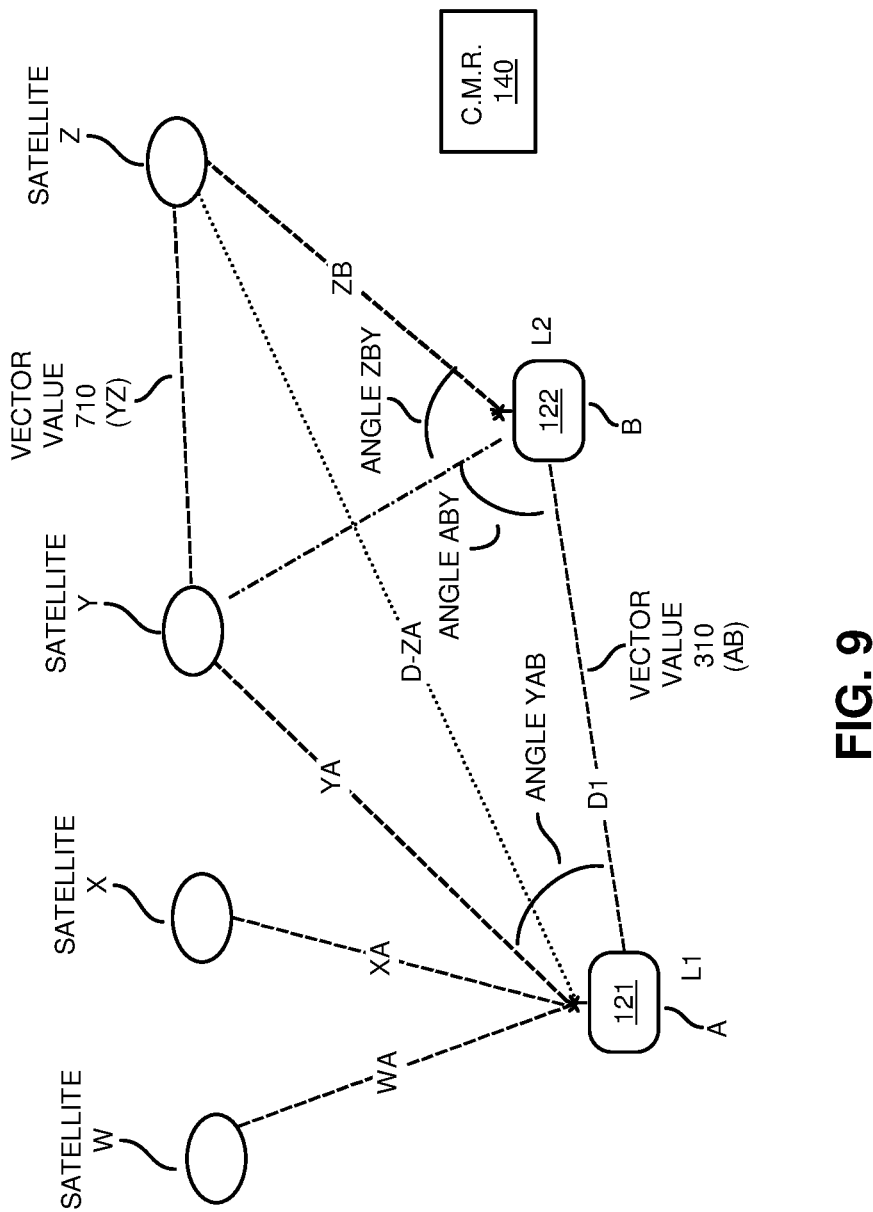
FIG. 9 is an example diagram illustrating processing of wireless signal information to derive a respective pseudo-range value according to embodiments herein.

FIG. 9 is an example diagram illustrating processing of wireless signal information to derive a pseudo-range value according to embodiments herein.

It is note that embodiments herein are different than the existing concept of real-time kinematic (RTK) positioning; where two or more GNSS receivers look at the same set of satellites to enhance the precision of their existing position fixes; primarily by comparing the phases of the signals that each receiver has received from the same set of satellites. RTK is generally used for land surveying and architectural purposes.

The GNSS fusion idea (such as use of first pseudo-range information bao wireless signals directly received by the communication device 121 and derived pseudo-range information) presented here is instead that each GNSS receiver sees some satellites, some of which may not be visible from the other receiver, but not enough of them for the receiver to locate itself in three dimensions (i.e., latitude, longitude, altitude); but by exchanging information about the satellites that it sees with another GNSS receiver at a known position offset, it is able to determine its own location.

EXAMPLE EMBODIMENT

In an exemplary embodiment, communication devices A (communication device 121) and B (communication device 122) are wirelessly connected to each other and are able to determine the relative three-dimensional position between each other via vector value 310. More specifically, based on known locations of satellites, the distance between satellite W and satellite X is WX; the distance between satellite Y and satellite Z is YZ; and so on.

As previously discussed, each communication device 121 and 122 is equipped with a GNSS receiver to receive wireless GNSS signals from respective satellites W, X, Y, Z. etc.

Assume in this example embodiment that communication device A (121) receives wireless signals from three GNSS satellites (W, X, and Y), while communication device B (122) receives wireless signals from another GNSS satellite Z.

In this example embodiment, the position (absolute locate) of each GNSS satellite is known because the operators of the satellites publish these in the ephemerides available to the public. Therefore, the distance between each and every GNSS satellite is already known.

The derived pseudo-range D-ZA can be obtained through trigonometry. First, the communication management resource 140 obtains derived pseudo-range YB. To do that, the communication management resource 140 needs angle ∠YAB.

$$\angle YAB = \cos^{-1}\left(\frac{\overline{YA}^2 + \overline{AB}^2 - \overline{ZB}^2}{2\overline{YA}\cdot\overline{AB}}\right)$$

where YA equals the distance between satellite Y and device A; AB equals the distance between communication device A and communication device B; ZB equals the distance between satellite Z and device B.

$$\overline{YB} = \sqrt{\overline{YA}^2 + \overline{AB}^2 - 2\overline{YA}\cdot\overline{AB}\cdot\cos(\angle YAB)}$$

where YB equals the distance between satellite Y and device B; AB equals the distance between communication device A and communication device B; ZB equals the distance between satellite Z and device B.

$$LABY = \cos^{-1}\left(\frac{\overline{AB}^2 + \overline{YB}^2 - \overline{YA}^2}{2\overline{AB}\cdot\overline{YB}}\right)$$

where YA equals the distance between satellite Y and device A; where YB equals the distance between satellite Y and device B; AB equals the distance between communication device A and communication device B.

$$LZBY = \cos^{-1}\left(\frac{\overline{ZB}^2 + \overline{ZY}^2 - \overline{YA}^2}{2\overline{ZB}\cdot\overline{ZY}}\right)$$

where ZB equals the distance between satellite Z and device B; where ZY equals the distance between satellite Z and satellite Y; YA equals the distance between satellite Y and communication device A.

$$\angle ABZ = \angle ABY + \angle ZBY$$

Finally, based on the above equations, the communication management resource 140 generates the derived pseudo-range D-ZA:

$$\overline{DZA} = \sqrt{\overline{ZB}^2 + \overline{AB}^2 - 2\overline{ZB}\cdot\overline{AB}\cdot\cos(\angle ABZ)}$$

Now, the communication management resource 140 such as at or associated with communication device A can be configured to calculate its three-dimensional GNSS position fix (latitude, longitude, altitude) using the normal GNSS formula with four pseudo-range values such as WA, XA, YA, and D-ZA (a.k.a., DZA).

Note that each of the multiple instances of derived pseudo-range information D-YA, etc., can be generated in a similar manner as previously discussed with respect to D-ZA.

FIG. 10 is an example flow diagram illustrating use of standard pseudo-range values and a derived pseudo-range value to calculate a 3-D position of a communication device according to embodiments herein.

In processing operation 1010, the communication management resource 140 receives pseudo-range values WA, XA, and YA (and derives respective distance values) associated with the device A (communication device 121) receiving wireless signals from respective satellites W, X, and Y in a manner as previously discussed.

In processing operation 1020, via vector value 310, the communication management resource 140 determines distance AB between device A (communication device 121) and device B (communication device 122).

In processing operation 1015, the communication management resource 140 receives the pseudo-range value ZB from the communication device 122. As previously discussed, the device B (communication device 122) generates the pseudo-range value associated with ZB based on wireless communications received from the satellite Z.

In processing operation 1025, the device B (communication device 122) communicates the pseudo-range value ZB to the communication management resource 140 (such as located at the communication device 121).

In processing operation 1030, the communication management resource 140 calculates (generates) the derived pseudo-range value D-ZA using pseudo-range value ZB and known distance AB between device A (communication device 121) and device B (communication device 122).

In processing operation 1040, the communication management resource 140 such as associated with the communication device 121 implements a standard GNSS processing and position algorithm to convert the pseudo-range values WA, XA, and YA and derived pseudo-range value D-ZA into a 3-D position (location L1) of the communication device 121 (device A).

Referring again to FIG. 5, assume in another example embodiment that communication device A (121) receives wireless signals from two GNSS satellites (W and X), while communication device B (122) receives wireless signals from multiple satellites including satellite Y and satellite Z. The determination of D-ZA is the same as previously discussed.

The communication management resource 140 can be configured to determine the value D-YA as below.

In this example embodiment, the position (absolute locate) of each GNSS satellite is known because the operators of the satellites publish these in the ephemerides available to the public. Therefore, the respective distance between each and every GNSS satellite and every the other satellite is already known. More specifically, based on known locations of satellites, the distance between satellite W and satellite X is WX; the distance between satellite Y and satellite Z is YZ; and so on.

The derived pseudo-range D-YA can be obtained through trigonometry. First, the communication management resource 140 obtains derived pseudo-range XB. To do that, the communication management resource 140 needs angle ∠XAB.

$$LXAB = \cos^{-1}\left(\frac{\overline{XA}^2 + \overline{AB}^2 - \overline{YB}^2}{2\overline{XA}\cdot\overline{AB}}\right)$$

where XA equals the distance between satellite X and device A; AB equals the distance between communication device A and communication device B; YB equals the distance between satellite Y and device B.

$$\overline{XB} = \sqrt{\overline{XA}^2 + \overline{AB}^2 - 2\overline{XA}\cdot\overline{AB}\cdot\cos(\angle XAB)}$$

where XB equals the distance between satellite X and device B; AB equals the distance between communication device A and communication device B; YB equals the distance between satellite Y and device B.

$$LABX = \cos^{-1}\left(\frac{\overline{AB}^2 + \overline{XB}^2 - \overline{XA}^2}{2\overline{AB}\cdot\overline{XB}}\right)$$

where XA equals the distance between satellite X and device A; where XB equals the distance between satellite X and device B; AB equals the distance between communication device A and communication device B.

$$LYBX = \cos^{-1}\left(\frac{\overline{YB}^2 + \overline{YX}^2 - \overline{XA}^2}{2\overline{YB}\cdot\overline{YX}}\right)$$

where YB equals the distance between satellite Y and device B; where YX equals the known distance between satellite Y and satellite X; XA equals the distance between satellite X and communication device A.

$$\angle ABY = \angle ABX + \angle YBX$$

Finally, based on the above equations, the communication management resource 140 generates the derived pseudo-range D-YA:

$$\overline{DYA} = \sqrt{\overline{YB}^2 + \overline{AB}^2 - 2\overline{YB} \cdot \overline{AB} \cdot \cos(\angle ABY)}$$

Now, the communication management resource 140 such as at or associated with communication device A can be configured to calculate its three-dimensional GNSS position fix (latitude, longitude, altitude) using the normal GNSS formula with four pseudo-range values such as WA, XA, D-YA (a.k.a., DYA), and D-ZA (a.k.a., DZA).

Figure 11:
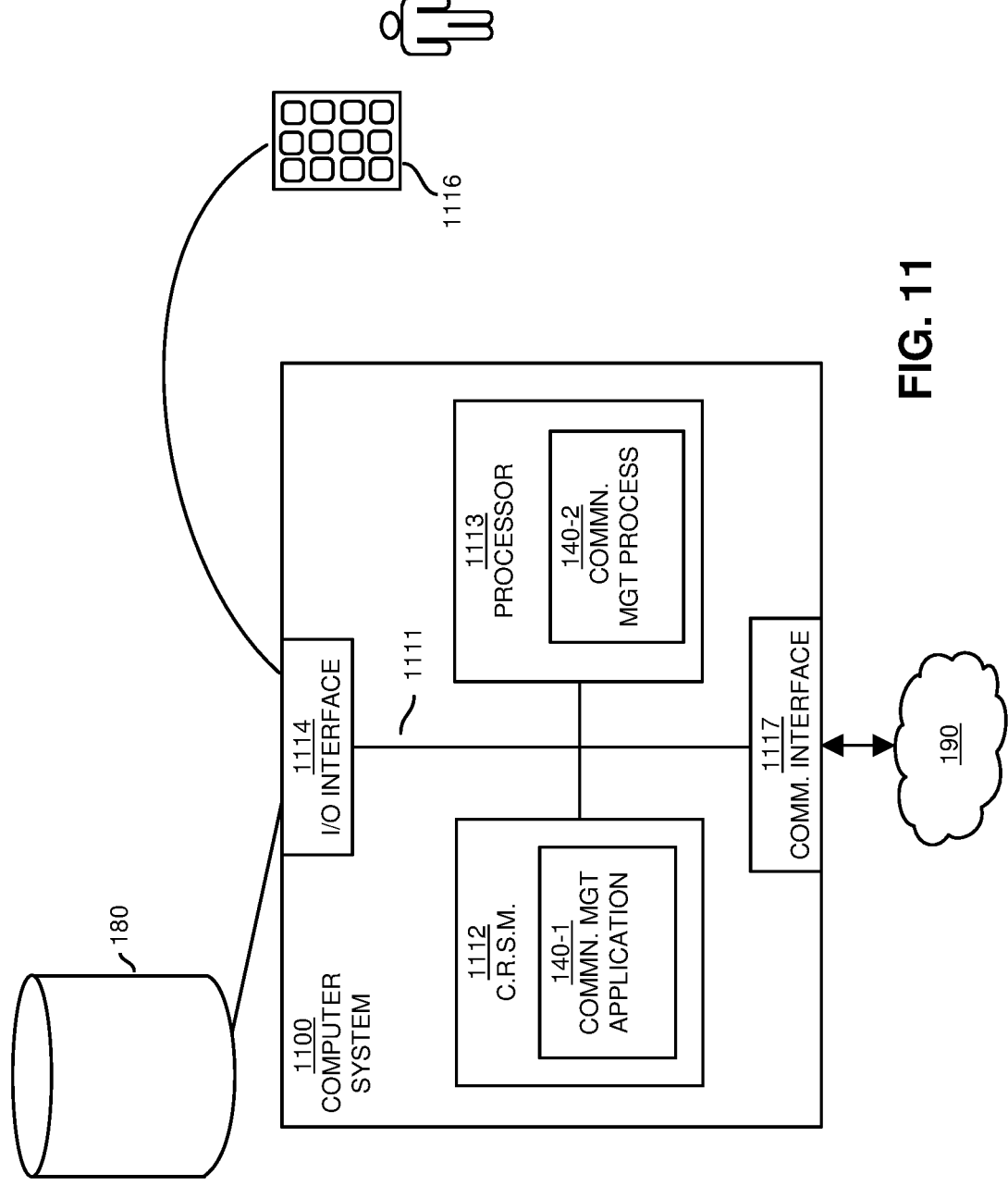
FIG. 11 is an example diagram illustrating example computer architecture operable to execute one or more operations according to embodiments herein.

FIG. 11 is an example block diagram of a computer system for implementing any of the operations as previously discussed according to embodiments herein.

Any of the resources (such as communication management resource 140, wireless satellites, communication device 121, communication device 122, etc.) as discussed herein can be configured to include computer processor hardware and/or corresponding executable instructions to carry out the different operations as discussed herein.

As shown, computer system 1150 of the present example includes an interconnect 1111 coupling computer readable storage media 1112 such as a non-transitory type of media (which can be any suitable type of hardware storage medium in which digital information can be stored and retrieved), a processor 1113 (computer processor hardware), I/O interface 1114, and a communications interface 1117.

I/O interface(s) 1114 supports connectivity to repository 1180 and input resource 1192.

Computer readable storage medium 1112 can be any hardware storage device such as memory, optical storage, hard drive, floppy disk, etc. In one embodiment, the computer readable storage medium 1112 stores instructions and/or data.

As shown, computer readable storage media 1112 can be encoded with communication management application 140-1 (e.g., including instructions) to carry out any of the operations as discussed herein.

During operation of one embodiment, processor 1113 accesses computer readable storage media 1112 via the use of interconnect 1111 in order to launch, run, execute, interpret or otherwise perform the instructions in communication with bank letters the check. For the bank account management application 140-1 stored on computer readable storage medium 1112. Execution of the communication management application 140-1 produces communication management process 140-2 to carry out any of the operations and/or processes as discussed herein.

Those skilled in the art will understand that the computer system 1150 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowchart in FIG. 12. Note that the steps in the flowcharts below can be executed in any suitable order.

FIG. 12 is a flowchart 1200 illustrating an example method according to embodiments. Note that there will be some overlap with respect to concepts as discussed above.

In processing operation 1210, the communication management resource 140 receives first location information indicating an absolute location of communication device 122.

In processing operation 1220, the communication management resource receives a vector value 310 indicating a relative location of communication device 121 (such as a primary wireless access point) with respect to the communication device 122.

In processing operation 1230, the communication management resource produces second location information indicating an absolute location L1 of the communication device 121 based on the first location information L2 and the vector value 310.

FIG. 13 is a flowchart 1300 illustrating an example method according to embodiments. Note that there will be some overlap with respect to concepts as discussed above.

In processing operation 1310, the communication management resource 140 receives first satellite information. The first satellite information is generated based on first wireless signals received by communication device 121.

In processing operation 1320, the communication management resource 140 receives second satellite information. The second satellite information is generated based on second wireless signals received by communication device 122.

In processing operation 1330, the communication management resource 140 generates first location information indicating a 3-d location of the communication device 121 based on the first satellite information, the second satellite information, and a vector value 310 indicating a relative location of the communication device 121 with respect to the communication device 122.

Note again that techniques herein are well suited to facilitate determination of locations of one or more wireless access points in a wireless network environment. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving first satellite information, the first satellite information generated based on first wireless signals received by a first communication device, wherein the first wireless signals are transmitted by a first set of satellites;
receiving second satellite information, the second satellite information generated based on second wireless signals received by a second communication device, wherein the second wireless signals are transmitted by a second set of satellites; and
generating first location information indicating a location of the first communication device based on the first satellite information, the second satellite information, and a vector value indicating a relative location of the first communication device with respect to the second communication device.

2. The method as in claim 1, wherein the first satellite information includes: i) a first value indicating a first estimated distance between a first satellite and the first communication device, ii) a second value indicating a second estimated distance between a second satellite and the first communication device.

3. The method as in claim 2, wherein the second satellite information includes: i) a third value indicating a third estimated distance between a third satellite and the second communication device, ii) a fourth value indicating a fourth estimated distance between a fourth satellite and the second communication device.

4. The method as in claim 3, wherein generating the first location information indicating the location of the first communication device includes:
deriving a fifth value based on a combination of the vector value and the third value, the derived fifth value indicating a fifth estimated distance between the third satellite and the first communication device and; and
deriving a sixth value based on a combination of the vector value and the fourth value, the derived sixth value indicating a sixth estimated distance between the fourth satellite and the first communication device.

5. The method as in claim 4, wherein generating the first location information indicating the location of the first communication device includes:
determining a 3-D location of the first communication device based on: the first value, the second value, the derived fifth value, and the derived sixth value.

6. The method as in claim 1, wherein the first satellite information includes: i) a first value indicating a first estimated distance between a first satellite and the first communication device, ii) a second value indicating a second estimated distance between a second satellite and the first communication device, and iii) a third value indicating a third estimated distance between a third satellite and the first communication device.

7. The method as in claim 6, wherein the second satellite information includes: i) a fourth value indicating a fourth distance between a fourth satellite and the second communication device.

8. The method as in claim 7, wherein generating the first location information indicating the location of the first communication device includes:
deriving a fifth value based on a combination of the vector value and the fourth value, the derived fifth value indicating a fifth estimated distance between the first communication device and the fourth satellite.

9. The method as in claim 8, wherein generating the first location information indicating the location of the first communication device includes:
determining the location of the first communication device based on: the first value, the second value, the third value, and the derived fifth value.

10. The method as in claim 1, wherein the vector value is a 3-D position offset vector between the first communication device and the second communication device.

11. The method as in claim 10, wherein the 3-D position offset vector is indicative of: i) an estimated distance between the second communication device and the first communication device, and ii) an angular orientation of the first communication device with respect to the second communication device.

12. The method as in claim 1 further comprising:
controlling a wireless power level of transmitting third wireless signals from the first communication device based on the location of the first communication device.

13. The method as in claim 12, wherein the first communication device is a primary wireless access point, and the location of the first communication device is indicative of an absolute location of the primary wireless access point.

14. The method as in claim 1, wherein the first communication device is a primary wireless access point; and
wherein the second communication device is an extender wireless access point with respect to the primary wireless access point, operation of the extender wireless access point being controlled by the primary wireless access point.

15. The method as in claim 1 further comprising:
receiving a distance value indicating a distance between a first satellite and a second satellite; and wherein generating the first location information includes: determining the location of the first communication device based at least in part on the distance value.

16. The method as in claim 1, wherein the first satellite information includes a first value indicating a first estimated distance between a first satellite and the first communication device; and wherein the second satellite information includes a second value indicating a second estimated distance between a second satellite and the second communication device.

17. The method as in claim 1, wherein the first communication device is operative to derive first distance information from the first wireless signals; and wherein the second communication device is operative to derive second distance information from the second wireless signals.

18. The method as in claim 1, wherein the first wireless signals include a first wireless signal transmitted from a first satellite;

wherein the second wireless signals include a second wireless signal transmitted from a second satellite, the method further comprising:

receiving a distance value indicating a distance between the first satellite and the second satellite; and determining the location of the first communication device based at least in part on the distance value.

19. The method as in claim 1 further comprising:

performing an initial estimate of the location of the first communication device based on receipt of the first wireless signals at the first communication device; and in response to detecting that an accuracy of the initial estimate of the location is less than a threshold level, determining the location of the first communication device based on a combination of the first satellite information, the second satellite information, and the vector value.

20. The method as in claim 1 further comprising:

determining the location of the first communication device based on the second satellite information and the vector value in response to detecting that the first satellite information is insufficient to determine an accuracy of the location of the first communication device above a threshold level.

21. The method as in claim 1 further comprising:

determining the location of the first communication device based on the second wireless signals and the vector value in response to an inability of the first communication device to receive satellite timing signals from multiple satellites to determine the location.

22. A system comprising:

communication management hardware operative to:

receive first satellite information, the first satellite information generated based on first wireless signals received by a first communication device;

receive second satellite information, the second satellite information generated based on second wireless signals received by a second communication device; and generate first location information indicating a location of the first communication device based on the first satellite information, the second satellite information, and a vector value indicating a relative location of the first communication device with respect to the second communication device;

wherein the first communication device is a primary wireless access point; and wherein the second communication device is an extender wireless access point with respect to the primary wireless access point, operation of the extender wireless access point being controlled by the primary wireless access point.

23. The system as in claim 22, wherein the first satellite information includes: i) a first value indicating a first estimated distance between a first satellite and the first communication device, ii) a second value indicating a second estimated distance between a second satellite and the first communication device.

24. The system as in claim 23, wherein the second satellite information includes: i) a third value indicating a third estimated distance between a third satellite and the second communication device, ii) a fourth value indicating a fourth estimated distance between a fourth satellite and the second communication device.

25. The system as in claim 24, wherein the communication management hardware is further operative to:

derive a fifth value based on a combination of the vector value and the third value, the derived fifth value indicating a fifth estimated distance between the first communication device and the third satellite; and derive a sixth value based on a combination of the vector value and the fourth value, the derived sixth value indicating a sixth estimated distance between the first communication device and the fourth satellite.

26. The system as in claim 25, wherein the communication management hardware is further operative to:

determine a 3-D location of the first communication device based on: the first value, the second value, the derived fifth value, and the derived sixth value.

27. The system as in claim 22, wherein the first satellite information includes: i) a first value indicating a first estimated distance between a first satellite and the first communication device, ii) a second value indicating a second estimated distance between a second satellite and the first communication device, and iii) a third value indicating a third estimated distance between a third satellite and the first communication device.

28. The system as in claim 27, wherein the second satellite information includes: i) a fourth value indicating a fourth distance between a fourth satellite and the second communication device.

29. The system as in claim 28, wherein the communication management hardware is further operative to:

derive a fifth value based on a combination of the vector value and the fourth value, the derived fifth value indicating a fifth estimated distance between the first communication device and the fourth satellite.

30. The system as in claim 21, wherein the communication management hardware is further operative to:

determine the location of the first communication device based on: the first value, the second value, the third value, and the derived fifth distance value.

31. Computer-readable storage hardware having instructions stored thereon, the instructions, when carried out by computer processor hardware, cause the computer processor hardware to:

receive first satellite information, the first satellite information generated based on first wireless signals received by a first communication device, wherein the first wireless signals are transmitted by a first set of satellites;

receive second satellite information, the second satellite information generated based on second wireless signals received by a second communication device, wherein the second wireless signals are transmitted by a second set of satellites; and generate first location information indicating a location of the first communication device based on the first satellite information, the second satellite information, and a vector value indicating a relative location of the first communication device with respect to the second communication device.

* * * * *